US010175385B2

(12) United States Patent
Jamison et al.

(10) Patent No.: US 10,175,385 B2
(45) Date of Patent: Jan. 8, 2019

(54) OPTIMIZATION VISUALIZATION USING NORMALIZED ACHIEVEMENT VARIABLES

(75) Inventors: Dale E. Jamison, Humble, TX (US); Robert L. Williams, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 1244 days.

(21) Appl. No.: 13/478,316

(22) Filed: May 23, 2012

(65) Prior Publication Data

US 2013/0314241 A1 Nov. 28, 2013

(51) Int. Cl.
G01V 3/00 (2006.01)
G01V 99/00 (2009.01)
E21B 44/00 (2006.01)

(52) U.S. Cl.
CPC .............. *G01V 99/00* (2013.01); *E21B 44/00* (2013.01)

(58) Field of Classification Search
CPC ........................................................ G01V 3/00
USPC ................................ 340/853.1, 854.1, 854.6
See application file for complete search history.

(56) References Cited

U.S. PATENT DOCUMENTS

| 4,748,849 | A | 6/1988 | Jamison et al. |
| 4,949,045 | A | 8/1990 | Clark et al. |
| 5,086,646 | A | 2/1992 | Jamison et al. |
| 5,278,549 | A * | 1/1994 | Crawford .................. 340/853.2 |
| 5,842,149 | A | 11/1998 | Harrell et al. |
| 6,302,203 | B1 | 10/2001 | Rayssiguier et al. |
| 6,584,833 | B1 | 7/2003 | Jamison et al. |
| 6,684,952 | B2 | 2/2004 | Brockman et al. |
| 6,727,827 | B1 | 4/2004 | Edwards et al. |
| 7,488,704 | B2 | 2/2009 | Kirsner et al. |
| 7,534,743 | B2 | 5/2009 | Kirsner et al. |
| 7,547,663 | B2 | 6/2009 | Kirsner et al. |
| 7,721,612 | B2 | 5/2010 | Jaimson |
| 8,151,633 | B2 | 4/2012 | Jamison et al. |
| 2007/0005316 | A1* | 1/2007 | Paez ............................... 703/10 |
| 2008/0091355 | A1* | 4/2008 | Sanstrom ......................... 702/6 |

(Continued)

FOREIGN PATENT DOCUMENTS

WO        2013/176781        11/2013

OTHER PUBLICATIONS

AU Examination Report No. 1, dated Feb. 5, 2015, Appl No. 2013266874, "Optimization Visualization Using Normalized Achievement Variables", filed Mar. 27, 2013, 3 pgs.

(Continued)

*Primary Examiner* — Amine Benlagsir
(74) *Attorney, Agent, or Firm* — Polsinelli PC

(57) ABSTRACT

The present disclosure describes various systems and methods for creating and presenting optimization visualizations that use normalized achievement variables. At least one illustrative method includes defining achievement functions that each operates on at least one of several achievement variables (each of the achievement variables representing a characteristic of a physical object or process), and transforming value ranges for at least two achievement variables into corresponding achievement level ranges by applying at least one of the achievement functions to the value ranges of the achievement variables (the achievement variables being a function of at least one common control variable). The method further includes combining the corresponding achievement level ranges to produce a combined achievement level range, and presenting a visual representation of the combined achievement level range to a user, enabling the user to select value ranges for the common control variable.

28 Claims, 16 Drawing Sheets

(56) References Cited

U.S. PATENT DOCUMENTS

| | | | |
|---|---|---|---|
| 2010/0191516 A1* | 7/2010 | Benish | E21B 43/00 703/10 |
| 2011/0172976 A1 | 7/2011 | Budiman et al. | |
| 2011/0203845 A1 | 8/2011 | Jamison et al. | |
| 2012/0011474 A1* | 1/2012 | Kashik et al. | 715/848 |
| 2012/0017673 A1 | 1/2012 | Godager | |
| 2012/0024050 A1 | 2/2012 | Godager | |
| 2012/0118637 A1 | 5/2012 | Wang et al. | |
| 2013/0110402 A1 | 5/2013 | Godager | |

OTHER PUBLICATIONS

PCT International Search Report and Written Opinion, dated Nov. 20, 2014, Appl No. PCT/US2013/033986, "Optimization Visualization Using Normalized Achievement Variables," Filed Mar. 27, 2013, 15 pgs.

International Search Report and Written Opinion; PCT Application No. PCT/US2013/033986; dated Nov. 20, 2014.

Extended European Search Report dated Jul. 6, 2016.

Eurasian Official Action; Eurasian Application No. 201491649/(31); dated Feb. 26, 2016.

Canada Examination Report; Canadian Application No. 2,870,606; dated Oct. 14, 2016.

Australian Examination Report No. 1; Australian Application No. 2013266874; dated Feb. 5, 2015.

GCC Examination Report; GCC Application No. GC 2013-24188; dated Jul. 21, 20016.

Mexico Official Action; Mexico Application No. MX/a/2014/012526; dated Mar. 10, 2016.

* cited by examiner

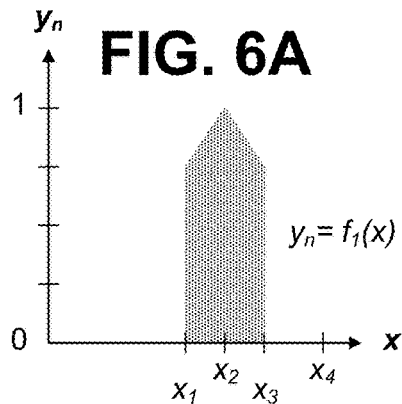
FIG. 6A
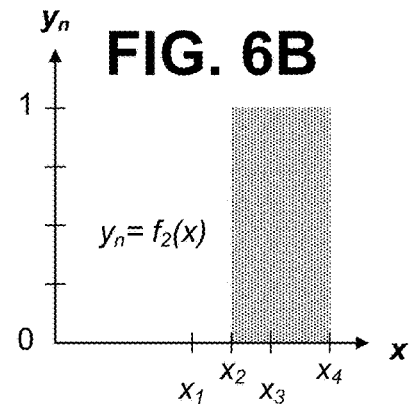
FIG. 6B
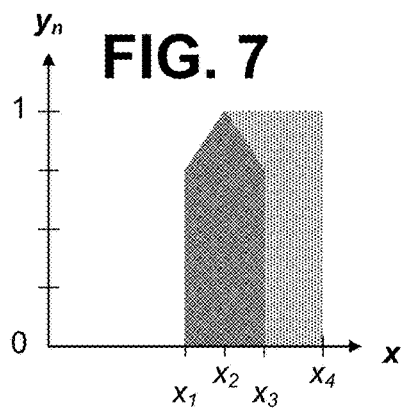
FIG. 7
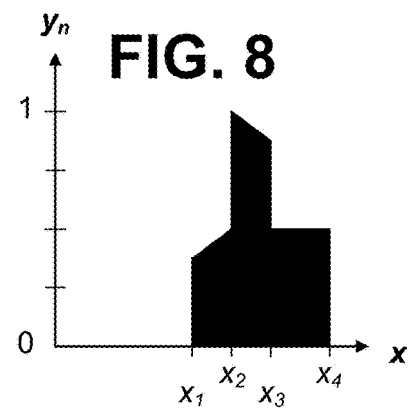
FIG. 8
| Raw ECD (ROP = 150 ft/hr) | | | | | |
|---|---|---|---|---|---|
| Q<br>Φ | 300.0 | 400.0 | 500.0 | 600.0 | 700.0 |
| 0.1 | 12.384 | 12.331 | 12.303 | 12.286 | 12.279 |
| 0.2 | 12.432 | 12.371 | 12.338 | 12.319 | 12.306 |
| 0.3 | 12.631 | 12.532 | 12.472 | 12.436 | 12.410 |
| 0.4 | 13.253 | 13.016 | 12.890 | 12.792 | 12.718 |
| 0.5 | 15.381 | 14.879 | 14.528 | 14.081 | 13.774 |
| Raw Cuttings Load (ROP = 150 ft/hr) | | | | | |
|---|---|---|---|---|---|
| Q<br>Φ | 300.0 | 400.0 | 500.0 | 600.0 | 700.0 |
| 0.1 | 2.660 | 1.980 | 1.582 | 1.322 | 1.145 |
| 0.2 | 3.388 | 2.597 | 2.095 | 1.778 | 1.541 |
| 0.3 | 5.894 | 4.561 | 3.738 | 3.172 | 2.745 |
| 0.4 | 12.898 | 9.932 | 8.269 | 7.017 | 6.066 |
| 0.5 | 35.214 | 29.115 | 24.988 | 20.182 | 16.833 |
FIG. 9A

Raw ECD (ROP = 100 ft/hr)

| Q / Φ | 300.0 | 400.0 | 500.0 | 600.0 | 700.0 |
|---|---|---|---|---|---|
| 0.1 | 12.300 | 12.268 | 12.252 | 12.244 | 12.242 |
| 0.2 | 12.331 | 12.295 | 12.276 | 12.266 | 12.262 |
| 0.3 | 12.467 | 12.402 | 12.365 | 12.343 | 12.330 |
| 0.4 | 12.864 | 12.730 | 12.647 | 12.582 | 12.536 |
| 0.5 | 14.337 | 13.779 | 13.752 | 13.448 | 13.575 |

Raw Cuttings Load (ROP = 100 ft/hr)

| Q / Φ | 300.0 | 400.0 | 500.0 | 600.0 | 700.0 |
|---|---|---|---|---|---|
| 0.1 | 1.776 | 1.326 | 1.064 | 0.878 | 0.749 |
| 0.2 | 2.259 | 1.730 | 1.399 | 1.183 | 1.029 |
| 0.3 | 3.953 | 3.040 | 2.490 | 2.113 | 1.833 |
| 0.4 | 8.471 | 6.673 | 5.560 | 4.682 | 4.054 |
| 0.5 | 23.907 | 17.600 | 16.813 | 13.524 | 14.526 |

FIG. 9B

Raw ECD (ROP = 50 ft/hr)

| Q / Φ | 300.0 | 400.0 | 500.0 | 600.0 | 700.0 |
|---|---|---|---|---|---|
| 0.1 | 12.215 | 12.204 | 12.202 | 12.204 | 12.207 |
| 0.2 | 12.331 | 12.218 | 12.214 | 12.214 | 12.216 |
| 0.3 | 12.298 | 12.271 | 12.259 | 12.253 | 12.250 |
| 0.4 | 12.502 | 12.438 | 12.396 | 12.369 | 12.352 |
| 0.5 | 13.110 | 12.971 | 12.877 | 12.755 | 12.924 |

Raw Cuttings Load (ROP = 50 ft/hr)

| Q / Φ | 300.0 | 400.0 | 500.0 | 600.0 | 700.0 |
|---|---|---|---|---|---|
| 0.1 | 0.895 | 0.669 | 0.537 | 0.443 | 0.300 |
| 0.2 | 1.137 | 0.866 | 0.703 | 0.595 | 0.500 |
| 0.3 | 1.979 | 1.520 | 1.248 | 1.060 | 0.900 |
| 0.4 | 4.293 | 3.367 | 2.747 | 2.318 | 2.000 |
| 0.5 | 10.760 | 8.906 | 7.690 | 6.285 | 6.600 |

FIG. 9C

ECD Achievement (ROP = 150 ft/hr)

| Q / Φ | 300.0 | 400.0 | 500.0 | 600.0 | 700.0 |
|---|---|---|---|---|---|
| 0.1 | 0.18 | 0.42 | 0.59 | 0.69 | 0.73 |
| 0.2 | 0.07 | 0.23 | 0.39 | 0.49 | 0.57 |
| 0.3 | 0.00 | 0.00 | 0.02 | 0.06 | 0.11 |
| 0.4 | 0.00 | 0.00 | 0.00 | 0.00 | 0.00 |
| 0.5 | 0.00 | 0.00 | 0.00 | 0.00 | 0.00 |

Cuttings Load Achvmnt. (ROP = 150 ft/hr)

| Q / Φ | 300.0 | 400.0 | 500.0 | 600.0 | 700.0 |
|---|---|---|---|---|---|
| 0.1 | 1.00 | 1.00 | 1.00 | 1.00 | 1.00 |
| 0.2 | 0.00 | 1.00 | 1.00 | 1.00 | 1.00 |
| 0.3 | 0.00 | 0.00 | 0.00 | 0.00 | 1.00 |
| 0.4 | 0.00 | 0.00 | 0.00 | 0.00 | 0.00 |
| 0.5 | 0.00 | 0.00 | 0.00 | 0.00 | 0.00 |

FIG. 10A

ECD Achievement (ROP = 100 ft/hr)

| Q / Φ | 300.0 | 400.0 | 500.0 | 600.0 | 700.0 |
|---|---|---|---|---|---|
| 0.1 | 0.61 | 0.79 | 0.87 | 0.91 | 0.92 |
| 0.2 | 0.42 | 0.64 | 0.75 | 0.80 | 0.83 |
| 0.3 | 0.03 | 0.13 | 0.26 | 0.36 | 0.43 |
| 0.4 | 0.00 | 0.00 | 0.00 | 0.00 | 0.00 |
| 0.5 | 0.00 | 0.00 | 0.00 | 0.00 | 0.00 |

Cuttings Load Achvmnt (ROP = 100 ft/hr)

| Q / Φ | 300.0 | 400.0 | 500.0 | 600.0 | 700.0 |
|---|---|---|---|---|---|
| 0.1 | 1.00 | 1.00 | 1.00 | 1.00 | 1.00 |
| 0.2 | 1.00 | 1.00 | 1.00 | 1.00 | 1.00 |
| 0.3 | 0.00 | 0.00 | 1.00 | 1.00 | 1.00 |
| 0.4 | 0.00 | 0.00 | 0.00 | 0.00 | 0.00 |
| 0.5 | 0.00 | 0.00 | 0.00 | 0.00 | 0.00 |

FIG. 10B

ECD Achievement (ROP = 50 ft/hr)

| Q \ φ | 300.0 | 400.0 | 500.0 | 600.0 | 700.0 |
|---|---|---|---|---|---|
| 0.1 | 0.99 | 1.00 | 1.00 | 1.00 | 1.00 |
| 0.2 | 0.95 | 0.98 | 0.99 | 0.99 | 0.99 |
| 0.3 | 0.82 | 0.78 | 0.84 | 0.87 | 0.88 |
| 0.4 | 0.00 | 0.06 | 0.18 | 0.24 | 0.31 |
| 0.5 | 0.00 | 0.00 | 0.00 | 0.00 | 0.00 |

Cuttings Load Achvmnt (ROP = 50 ft/hr)

| Q \ φ | 300.0 | 400.0 | 500.0 | 600.0 | 700.0 |
|---|---|---|---|---|---|
| 0.1 | 1.00 | 1.00 | 1.00 | 1.00 | 1.00 |
| 0.2 | 1.00 | 1.00 | 1.00 | 1.00 | 1.00 |
| 0.3 | 1.00 | 1.00 | 1.00 | 1.00 | 1.00 |
| 0.4 | 0.00 | 0.00 | 1.00 | 1.00 | 1.00 |
| 0.5 | 0.00 | 0.00 | 0.00 | 0.00 | 0.00 |

FIG. 10C

Combined Achievement (ROP = 150 ft/hr)

| Q \ φ | 300.0 | 400.0 | 500.0 | 600.0 | 700.0 |
|---|---|---|---|---|---|
| 0.1 | 0.35 | 0.54 | 0.67 | 0.75 | 0.79 |
| 0.2 | 0.05 | 0.39 | 0.51 | 0.59 | 0.66 |
| 0.3 | 0.00 | 0.00 | 0.00 | 0.08 | 0.29 |
| 0.4 | 0.00 | 0.00 | 0.00 | 0.00 | 0.00 |
| 0.5 | 0.00 | 0.00 | 0.00 | 0.00 | 0.00 |

FIG. 11A

Combined Achievement (ROP = 100 ft/hr)

| Q \ φ | 300.0 | 400.0 | 500.0 | 600.0 | 700.0 |
|---|---|---|---|---|---|
| 0.1 | 0.60 | 0.83 | 0.90 | 0.93 | 0.93 |
| 0.2 | 0.54 | 0.71 | 0.80 | 0.84 | 0.86 |
| 0.3 | 0.02 | 0.10 | 0.41 | 0.49 | 0.54 |
| 0.4 | 0.00 | 0.00 | 0.00 | 0.00 | 0.00 |
| 0.5 | 0.00 | 0.00 | 0.00 | 0.00 | 0.00 |

FIG. 11B

Combined Achievement (ROP = 50 ft/hr)

| Q \ φ | 300.0 | 400.0 | 500.0 | 600.0 | 700.0 |
|---|---|---|---|---|---|
| 0.1 | 0.99 | 1.00 | 1.00 | 1.00 | 1.00 |
| 0.2 | 0.98 | 0.99 | 0.99 | 0.99 | 0.99 |
| 0.3 | 0.69 | 0.82 | 0.87 | 0.90 | 0.91 |
| 0.4 | 0.00 | 0.00 | 0.32 | 0.39 | 0.45 |
| 0.5 | 0.00 | 0.00 | 0.00 | 0.00 | 0.00 |

FIG. 11C

Combo Achvmnt w/ Solids (ROP=150 ft/hr)

| Q<br>Φ | 300.0 | 400.0 | 500.0 | 600.0 | 700.0 |
|---|---|---|---|---|---|
| 0.1 | 0.24 | 0.32 | 0.40 | 0.45 | 0.49 |
| 0.2 | 0.02 | 0.28 | 0.36 | 0.41 | 0.45 |
| 0.3 | 0.00 | 0.00 | 0.00 | 0.02 | 0.25 |
| 0.4 | 0.00 | 0.00 | 0.00 | 0.00 | 0.00 |
| 0.5 | 0.00 | 0.00 | 0.00 | 0.00 | 0.00 |

Combo Achvmnt w/ Solids (ROP=100 ft/hr)

| Q<br>Φ | 300.0 | 400.0 | 500.0 | 600.0 | 700.0 |
|---|---|---|---|---|---|
| 0.1 | 0.27 | 0.33 | 0.37 | 0.39 | 0.40 |
| 0.2 | 0.37 | 0.51 | 0.59 | 0.63 | 0.65 |
| 0.3 | 0.01 | 0.26 | 0.31 | 0.38 | 0.41 |
| 0.4 | 0.00 | 0.00 | 0.00 | 0.00 | 0.00 |
| 0.5 | 0.00 | 0.00 | 0.00 | 0.00 | 0.00 |

Combo Achvmnt w/ Solids (ROP=50 ft/hr)

| Q<br>Φ | 300.0 | 400.0 | 500.0 | 600.0 | 700.0 |
|---|---|---|---|---|---|
| 0.1 | 0.52 | 0.55 | 0.56 | 0.55 | 0.53 |
| 0.2 | 0.79 | 0.86 | 0.87 | 0.87 | 0.86 |
| 0.3 | 0.55 | 0.67 | 0.72 | 0.75 | 0.76 |
| 0.4 | 0.17 | 0.03 | 0.28 | 0.32 | 0.37 |
| 0.5 | 0.00 | 0.00 | 0.00 | 0.00 | 0.00 |

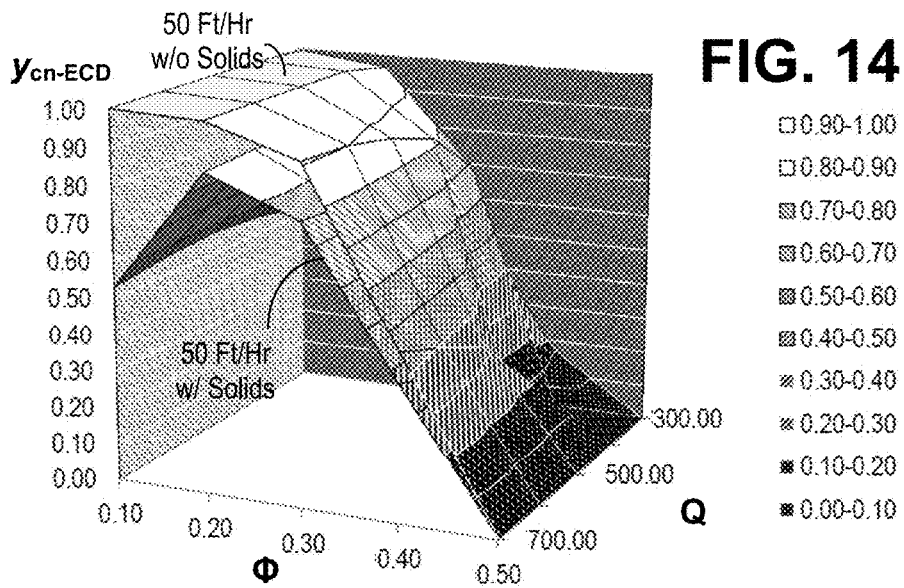

ECD Achievement (ROP = 25 ft/hr)

| Q\RPM | 500.0 | 625.0 | 750.0 | 875.0 | 1000.0 |
|---|---|---|---|---|---|
| 160 | 0.98 | 1.00 | 1.00 | 1.00 | 1.00 |
| 140 | 0.99 | 0.99 | 1.00 | 1.00 | 0.99 |
| 120 | 0.99 | 1.00 | 1.00 | 1.00 | 0.99 |
| 100 | 0.99 | 1.00 | 1.00 | 1.00 | 0.99 |
| 80 | 1.00 | 1.00 | 1.00 | 1.00 | 0.99 |
| 60 | 1.00 | 1.00 | 0.99 | 0.98 | 0.96 |
| 40 | 0.66 | 0.56 | 0.53 | 0.43 | 0.34 |

SPP
Achievement
(Independent of ROP)

| Q | 500.0 | 625.0 | 750.0 | 875.0 | 1000.0 |
|---|---|---|---|---|---|
| | 1.00 | 1.00 | 1.00 | 0.00 | 0.00 |

BHA Vibration
Achievement
(Independent of ROP)

| RPM | 40 | 45 | 50 | 60 | 80 | 100 | 105 | 110 | 115 | 120 | 140 | 160 |
|---|---|---|---|---|---|---|---|---|---|---|---|---|
| | 0.7 | 0.0 | 0.7 | 1.0 | 1.0 | 1.0 | 0.5 | 0.0 | 0.5 | 1.0 | 1.0 | 1.0 |

Combined Achievement (ROP = 225 ft/hr)

| Q<br>RPM | 500.0 | 625.0 | 750.0 | 875.0 | 1000.0 |
|---|---|---|---|---|---|
| 160 | 0.28 | 0.38 | 0.47 | 0.00 | 0.00 |
| 140 | 0.27 | 0.09 | 0.46 | 0.00 | 0.00 |
| 120 | 0.00 | 0.34 | 0.42 | 0.00 | 0.00 |
| 115 | 0.00 | 0.42 | 0.45 | 0.00 | 0.00 |
| 110 | 0.00 | 0.00 | 0.00 | 0.00 | 0.00 |
| 105 | 0.00 | 0.40 | 0.44 | 0.00 | 0.00 |
| 100 | 0.00 | 0.29 | 0.36 | 0.00 | 0.00 |
| 80 | 0.00 | 0.00 | 0.27 | 0.00 | 0.00 |
| 60 | 0.00 | 0.00 | 0.00 | 0.00 | 0.00 |
| 50 | 0.00 | 0.00 | 0.00 | 0.00 | 0.00 |
| 45 | 0.00 | 0.00 | 0.00 | 0.00 | 0.00 |
| 40 | 0.00 | 0.00 | 0.00 | 0.00 | 0.00 |

FIG. 21A

Combined Achievement (ROP = 175 ft/hr)

| Q<br>RPM | 500.0 | 625.0 | 750.0 | 875.0 | 1000.0 |
|---|---|---|---|---|---|
| 160 | 0.43 | 0.56 | 0.64 | 0.00 | 0.00 |
| 140 | 0.43 | 0.54 | 0.63 | 0.00 | 0.00 |
| 120 | 0.39 | 0.52 | 0.59 | 0.00 | 0.00 |
| 115 | 0.44 | 0.50 | 0.54 | 0.00 | 0.00 |
| 110 | 0.00 | 0.00 | 0.00 | 0.00 | 0.00 |
| 105 | 0.42 | 0.48 | 0.48 | 0.00 | 0.00 |
| 100 | 0.33 | 0.44 | 0.52 | 0.00 | 0.00 |
| 80 | 0.00 | 0.33 | 0.40 | 0.00 | 0.00 |
| 60 | 0.00 | 0.00 | 0.00 | 0.00 | 0.00 |
| 50 | 0.00 | 0.00 | 0.00 | 0.00 | 0.00 |
| 45 | 0.00 | 0.00 | 0.00 | 0.00 | 0.00 |
| 40 | 0.00 | 0.00 | 0.00 | 0.00 | 0.00 |

FIG. 21B

Combined Achievement (ROP = 125 ft/hr)

| Q<br>RPM | 500.0 | 625.0 | 750.0 | 875.0 | 1000.0 |
|---|---|---|---|---|---|
| 160 | 0.74 | 0.78 | 0.83 | 0.00 | 0.00 |
| 140 | 0.68 | 0.77 | 0.82 | 0.00 | 0.00 |
| 120 | 0.65 | 0.74 | 0.79 | 0.00 | 0.00 |
| 115 | 0.57 | 0.61 | 0.64 | 0.00 | 0.00 |
| 110 | 0.00 | 0.00 | 0.00 | 0.00 | 0.00 |
| 105 | 0.55 | 0.60 | 0.62 | 0.00 | 0.00 |
| 100 | 0.59 | 0.68 | 0.73 | 0.00 | 0.00 |
| 80 | 0.46 | 0.57 | 0.63 | 0.00 | 0.00 |
| 60 | 0.00 | 0.31 | 0.36 | 0.00 | 0.00 |
| 50 | 0.00 | 0.43 | 0.44 | 0.00 | 0.00 |
| 45 | 0.00 | 0.00 | 0.00 | 0.00 | 0.00 |
| 40 | 0.00 | 0.00 | 0.00 | 0.00 | 0.00 |

FIG. 21C

Combined Achievement (ROP = 75 ft/hr)

| Q<br>RPM | 500.0 | 625.0 | 750.0 | 875.0 | 1000.0 |
|---|---|---|---|---|---|
| 160 | 0.94 | 0.96 | 0.96 | 0.00 | 0.00 |
| 140 | 0.93 | 0.95 | 0.96 | 0.00 | 0.00 |
| 120 | 0.92 | 0.94 | 0.95 | 0.00 | 0.00 |
| 115 | 0.71 | 0.72 | 0.72 | 0.00 | 0.00 |
| 110 | 0.00 | 0.00 | 0.00 | 0.00 | 0.00 |
| 105 | 0.70 | 0.71 | 0.72 | 0.00 | 0.00 |
| 100 | 0.90 | 0.92 | 0.93 | 0.00 | 0.00 |
| 80 | 0.83 | 0.87 | 0.88 | 0.00 | 0.00 |
| 60 | 0.61 | 0.67 | 0.70 | 0.00 | 0.00 |
| 50 | 0.50 | 0.52 | 0.52 | 0.00 | 0.00 |
| 45 | 0.00 | 0.00 | 0.00 | 0.00 | 0.00 |
| 40 | 0.00 | 0.00 | 0.00 | 0.00 | 0.00 |

FIG. 21D

Combined Achievement (ROP = 25 ft/hr)

| Q\RPM | 500.0 | 625.0 | 750.0 | 875.0 | 1000.0 |
|---|---|---|---|---|---|
| 160 | 0.98 | 1.00 | 1.00 | 0.00 | 0.00 |
| 140 | 0.99 | 0.99 | 1.00 | 0.00 | 0.00 |
| 120 | 0.99 | 1.00 | 1.00 | 0.00 | 0.00 |
| 115 | 0.74 | 0.75 | 0.75 | 0.00 | 0.00 |
| 110 | 0.00 | 0.00 | 0.00 | 0.00 | 0.00 |
| 105 | 0.75 | 0.75 | 0.75 | 0.00 | 0.00 |
| 100 | 0.99 | 1.00 | 1.00 | 0.00 | 0.00 |
| 80 | 1.00 | 1.00 | 1.00 | 0.00 | 0.00 |
| 60 | 1.00 | 1.00 | 0.99 | 0.00 | 0.00 |
| 50 | 0.77 | 0.74 | 0.73 | 0.00 | 0.00 |
| 45 | 0.00 | 0.00 | 0.00 | 0.00 | 0.00 |
| 40 | 0.68 | 0.63 | 0.62 | 0.00 | 0.00 |

OPTIMIZATION VISUALIZATION USING NORMALIZED ACHIEVEMENT VARIABLES

BACKGROUND

The complexity of many real-world problems sometimes makes it difficult or impossible to achieve a single, best objective. It may instead only be possible to identify an optimal combination of multiple, partially achieved objectives. In solving such problems, objectives are correlated to each other through one or more control variables, and the achievement level of each objective is calculated as a function of the applicable control variable values. An optimal solution is identified that provides the maximum overall achievement level as measured by some combination of individual achievement levels. Because of the complexity of the relationships that can exist between control variables and objectives, altering a control variable value to increase the achievement level of one objective may decrease the achievement level of another objective. In extreme cases, some objectives may in fact be mutually exclusive, requiring a reevaluation of what achievement levels are acceptable for each objective.

The drilling of oil & gas wells is an example of such a problem, where even just a few control variables (e.g., weight on bit, drill bit rotational speed and drilling fluid flow rate) can impact a number of differing objectives in widely varying ways. Such objectives may include, for example, maximizing the rate or penetration, keeping the equivalent circulating density below the fracture gradient, minimizing the frequency of drill bit replacement, and minimizing vibrations at the bottom-hole assembly. Thus, for example, increasing the weight on bit may increase the rate of penetration (generally desirable), but may also increase the frequency with which the drill string must be tripped to replace worn drill bits (generally undesirable).

While a number of mathematical techniques exist for performing multi-objective optimization, many of these techniques focus on finding closed-form solutions, i.e., solutions that can be expressed analytically in terms of a bounded number of well-known functions (e.g., constants, single variables, elementary arithmetic operations, nth roots, exponents, logarithms, etc.). As already alluded to, objectives may conflict to such a degree as to preclude analytically expressing the optimization problem in closed form. In such cases, recursive techniques that attempt to iteratively combine the objectives until an acceptable optimization is identified will typically diverge without identifying a solution. Further, such techniques provide little if any feedback usable to identify what steps may be taken to resolve a conflict between objectives, or to identify how variations in the control variable values affect the degree of incompatibility between the objectives.

BRIEF DESCRIPTION OF THE DRAWINGS

Accordingly, there are disclosed in the drawings and the following description specific examples of optimization visualization systems and methods employing normalized achievement variables. In the drawings:

FIGS. 6A and 6B shows example graphs of two achievement functions related through a common control variable x.

FIG. 7 shows an illustrative graph of the two achievement functions of FIGS. 6A and 6B overlaid over each other.

FIG. 8 shows an illustrative graph of the weighted sum of the two achievement functions of FIGS. 6A and 6B.

FIGS. 9A-9C show example tabularized ECD and cuttings load achievement variable values as a function of cuttings diameter, drilling fluid flow rate and rate of penetration.

FIGS. 10A-10C show achievement level tables corresponding respectively to the tables of FIGS. 9A-9C.

FIGS. 11A-11C show achievement level tables that result from combining the ECD and cuttings load achievement level tables of FIGS. 10A-10C.

FIG. 14 shows an illustrative three-dimensional visualization of the combined achievement level value tables of FIGS. 11C and 13C.

FIGS. 15A-15E show achievement level tables for ECD values as a function of drillstring RPM and drilling fluid flow rate.

FIG. 16 shows an illustrative three-dimensional visualization of the ECD achievement level values of the tables of FIGS. 15A-15E.

FIGS. 21A-21E show combined achievement level tables reflecting the weighted sum of the achievement values of FIGS. 15A-15E, 17 and 19.

FIG. 22 shows an illustrative three-dimensional visualization of the combined achievement level values of the tables of FIGS. 21A-21E.

Figure 1:
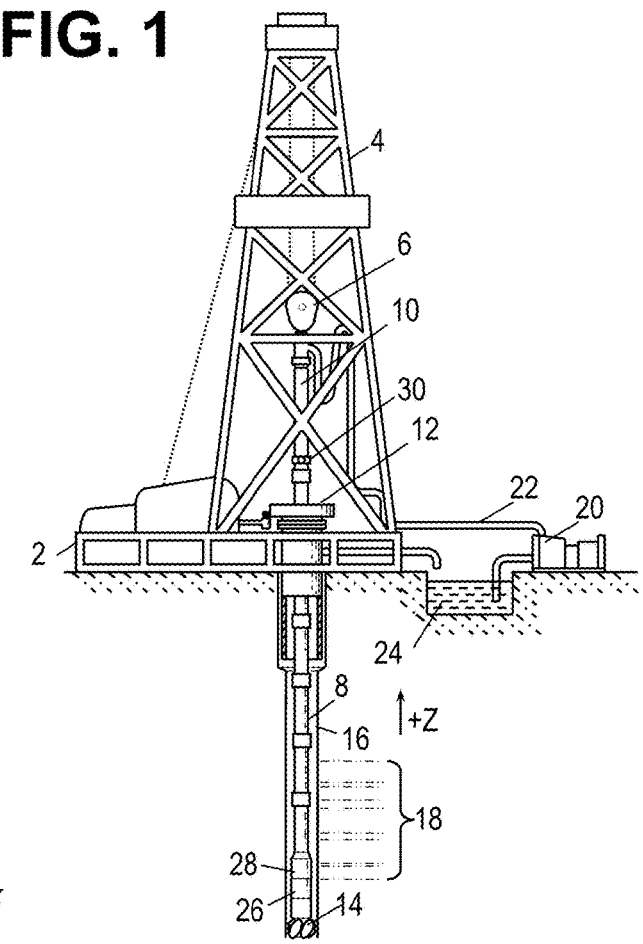
FIG. 1 shows an illustrative drilling rig that incorporates at least some illustrative systems and methods for visualizing achievement variable optimizations.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

The paragraphs that follow describe illustrative optimization visualization systems and methods using normalized achievement variables. A basic overview of achievement functions (described in more detail below) and their use within optimization problems is first presented, along with examples of different types of such functions within the context of well-drilling operations and simulations of such operations. Techniques and examples for producing achievement levels from the achievement functions and combining such achievement levels are described, with a focus on presenting such combinations as a visualization of an optimization problem. Illustrative visualizations of several well-drilling optimization examples are then described. Finally, an illustrative method is detailed within the context of both a well design tool and a real-time drilling system, as is a computer-based embodiment that implements the described method.

As previously noted, optimization problems may involve a series of conflicting objectives that need to be balanced against each other. In order to accomplish this balance, the relevant objectives first need to be identified and quantified. One or more levels and/or ranges of values are specified that define whether an objective is achieved, and to what degree. While the specification of such levels and ranges may be based on either subjective or empirical observations, the end result is a quantified measure of the achievement level of an objective. This quantified achievement level can be expressed as a function of one or more control variables, and this function is referred to in the present disclosure as an achievement function.

Throughout this disclosure oil and gas well-drilling operations and simulations are used to illustrate how an achievement function may be identified and utilized to help identify solutions to an optimization problem. FIG. 1 shows an example of a drilling rig that incorporates at least some of the illustrative systems and methods described herein. A drilling platform 2 supports a derrick 4 having a traveling block 6 for raising and lowering a drill string 8. A kelly 10 supports the drill string 8 as it is lowered through a rotary table 12. A drill bit 14 is driven by a downhole motor and/or rotation of the drill string 8. As bit 14 rotates, it creates a borehole 16 that passes through various formations 18. A pump 20 circulates drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole into the pit 24 and aids in maintaining the borehole integrity.

A logging while drilling (LWD) tool 26 is integrated into the bottom-hole assembly (BHA) near the bit 14. As the bit extends the borehole through the formations, LWD tool 26 collects measurements relating to various formation properties as well as the tool orientation and various other drilling conditions. LWD tool 26 may take the form of a drill collar, i.e., a thick-walled tubular that provides weight and rigidity to aid the drilling process. LWD tool 26 may also include an optical fluid analysis tool that monitors borehole fluid properties. A telemetry sub 28 may be included to transfer measurement data to a surface receiver 30 and to receive commands from the surface. In some embodiments, the telemetry sub 28 does not communicate with the surface, but rather stores logging data for later retrieval at the surface when the logging assembly is recovered.

The process of drilling a well using a rig like that in FIG. 1 can be described as a multi-variable optimization problem. In its simplest form, the objective is to drill as fast as possible and to minimize cost. Stated differently, the objective is to keep the rate of penetration (ROP) as high as possible, without exceeding other constraints that can result in an increase in NPT. Such constraints may include, but are not limited to:

- maximizing the removal rate of cuttings from a drilled hole;
- maintaining the equivalent circulating density (ECD) below the fracture gradient;
- maintaining the equivalent static density (ESD) above the pore pressure;
- keeping the drill pipe from packing off from poor cuttings transport;
- minimizing drill string torque, drag and vibration;
- maximizing drill bit life and ROP;
- maintain and control weight on bit (WOB);
- the drilling fluid rheology and density;
- drilling hole placement; and
- managing cuttings diameter.

Figure 2:
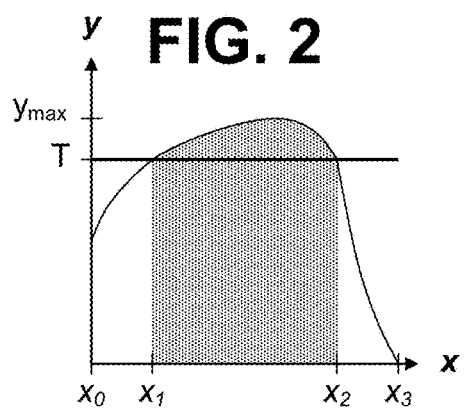
FIG. 2 shows an example of an achievement variable y as a function of a control variable x.

Each of the above-described constraints may be presented as achievement variables that are restricted to certain acceptable value ranges. Achievement functions may then be defined that produce an achievement level based on whether values of the achievement variables are maintained within the defined acceptable ranges, and also based on how close such values are to a threshold between an acceptable and unacceptable range. FIG. 2 shows an example of an achievement variable y as a function of a control variable x. In this example, a threshold value y=T is established, creating two groups of ranges. For values of $x<x_1$ and $x>x_2$, y is below the threshold value. For $x_1<x<x_2$, y is above the threshold value. Depending on the nature of the achievement variable, either group may define a range of acceptable values for y. For illustration purposes, values above the threshold value T in FIG. 2 will be treated as acceptable values. It should be noted that while y is dependent upon x, the disclosed systems and methods do not require characterizing and/or quantifying the relationship between x and y. All that is needed are the value pairs themselves. Thus, for example, empirical measurements taken at a drill site may be used without necessarily understanding why or how y varies as a function of x.

Figure 3:
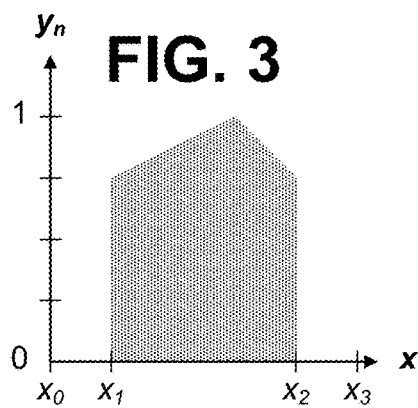
FIG. 3 shows an illustrative achievement function graphed as a function of a control variable x.

Once a range of acceptable values for an achievement variable have been defined, an achievement function f(x) can be defined that produces a normalized value. While the normalized achievement values $y_n$ (i.e., the achievement level) produced by an achievement function f(x) may be defined within any number of value ranges, for simplicity the examples and embodiments disclosed will use achievement levels ranging from $y_n=0$ to $y_n=1$. FIG. 3 shows a graph of the achievement function for the example of FIG. 2. For this achievement function, the achievement level $y_n$ reaches a maximum value of 1 (full or best achievement) when the value of achievement variable y is at its maximum, and drops off linearly as the value of y decreases while above the threshold value T. Once at or below the threshold value, the achievement level $y_n$ drops to zero (no achievement or failure to achieve the objective).

Figure 4:
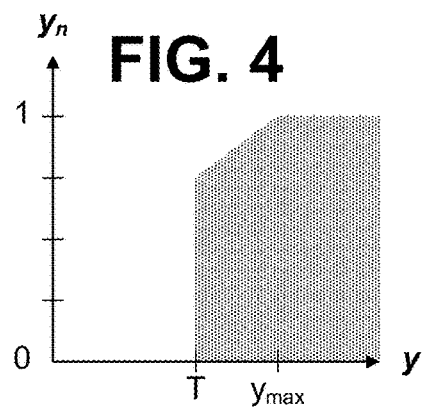
FIG. 4 shows an illustrative achievement function graphed as a function of an achievement variable y.

It should be noted that the achievement function $y_n=f(x)$ is expressed as a function of control variable x, not achievement variable y. This enables more easily correlating two or more achievement functions, as explained in more detail below. Nonetheless, it is sometimes useful to describe the behavior of an achievement function by graphing achievement level $y_n$ as a function of achievement variable y. Such a graph helps to illustrate the relationship between an achievement variable and the metric used to measure the achievement level. FIG. 4, for example, shows a graph of the relationship between achievement level $y_n$ and achievement variable y used to define the achievement function of FIG. 3. For achievement variable values y at or above $y_{max}$, achievement level $y_n=1$. Below $y=y_{max}$, achievement level $y_n$ decreases linearly from 1 to 0.75 until y=T. For achievement variable values y below T, the achievement level $y_n$ is zero.

Figure 5A:
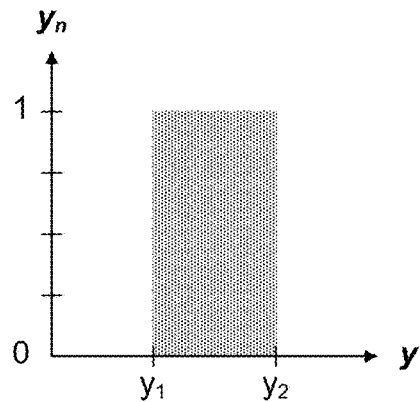
FIGS. 5A through 5E show additional examples of achievement functions.
Figure 5B:
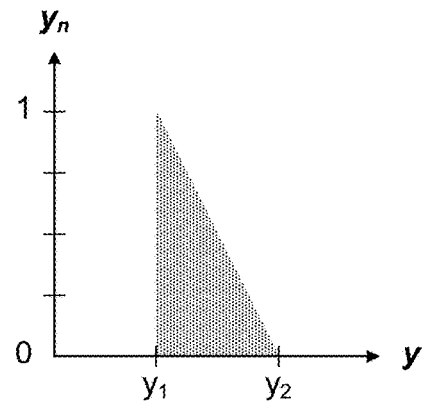
Figure 5C:
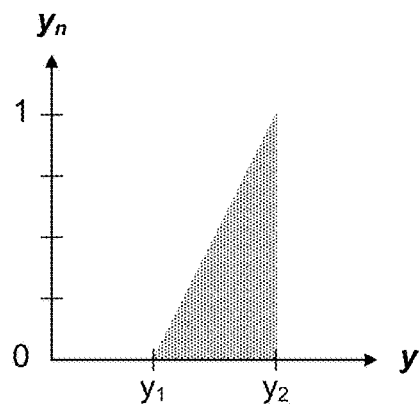

FIGS. 5A through 5E show other examples of relationships between achievement variable y and achievement level $y_n$, usable to define achievement functions that may be implemented by variations of the disclosed illustrative embodiments. FIG. 5A shows a pulse function, wherein an objective is fully achieved ($y_n=1$) for a range of achievement variable values ($y_1$ through $y_2$), but not achieved at all ($y_n=0$) for values outside that range (i.e., a yes or no achievement). FIG. 5B shows a step function from no achievement to full achievement for values above $y_1$, and then a linear reduction to no achievement between $y_1$ and $y_2$ (i.e., a lower achievement target with an upper limit). FIG. 5C shows no achievement below $y_1$, then a linear increase from no achievement to full achievement between $y_1$ and $y_2$, and then a step function from full achievement to no achievement above $y_2$ (i.e., an upper achievement target with a lower limit).

Figure 5D:
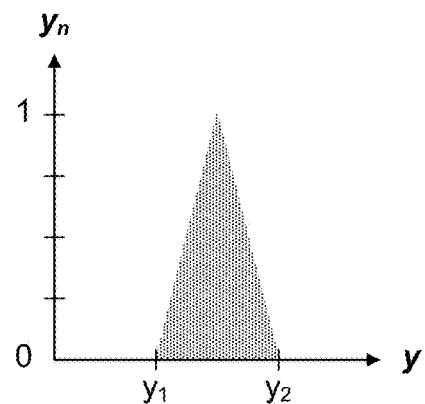
Figure 5E:
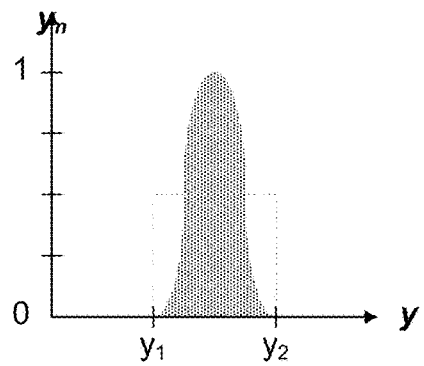

FIG. 5D shows no achievement outside the range between $y_1$ and $y_2$, a gradual linear increase from no achievement at $y_1$ to full achievement at a midpoint between $y_1$ and $y_2$, and a decrease from full achievement at the midpoint to no achievement at $y_2$ (an achievement target at a midpoint between a lower and an upper limit). FIG. 5E shows a graph similar to 5D, but with an achievement function that is based upon a Gaussian distribution about a midpoint. These are just a few examples of relationships usable to define an achievement function. Many other such relationships will become apparent to those of ordinary skill in the art, and all such relationships are within the scope of the present disclosure.

As can be seen from the descriptions above, the achievement functions of the described illustrative embodiments produce a range of achievement levels based upon a range of control variable values. By graphically presenting ranges of achievement levels generated by the achievement functions and/or combinations of achievement levels, a user of said illustrative embodiments can identify ranges of control variable values that achieve an objective, ranges of control variable values that fail to achieve the objective, and the behavior of the transition between achievement and non-achievement. Such information can assist a user in identifying not only what range of control variable values will provide the best overall achievement levels, but also such things as the sensitivity between changes in control variables and the overall achievement level, which control variables have the narrowest achievement level window compared to other control variables, and which control variables may be causing anomalies in the overall combined achievement level.

The use of achievement levels produced by achievement functions, which as normalized values are by definition unitless, facilitates combining the results of two or more achievement functions, such as the two illustrative achievement functions shown in FIG. 6. In the example shown, the two achievement functions $f_1(x)$ and $f_2(x)$ both depend upon control variable x. FIG. 7 shows the two functions overlaid along a common range for control variable x. The two functions may be combined to produce a single combined achievement level. FIG. 8 illustrates such a combination, using a weighted sum of each individual achievement level with a weighting factor of 0.5 for both levels. As can be seen in FIG. 8, the area where the two achievement functions overlap is where the combined achievement level is highest.

It should be noted that although the two functions combined in the example of FIG. 8 both directly depend upon the same control variable, other illustrative embodiments may include at least one achievement function that is indirectly dependent upon one or more control variables. In such a case, a separate mapping function may map a first set of control variable values for one function onto a range of interest of a second set of control variable values for another function. This permits both functions to be graphed relative to a common range of control variable values.

To better illustrate the use of achievement functions and achievement levels, and to further illustrate how achievement levels produced by multiple achievement functions can be combined to generate combined achievement levels, a well drilling example is presented below. The values used in the example are presented as drilling modeling program values produced during the well design phase. Nonetheless, real-time data from an actual well being drilled may also be used (e.g., to evaluate the efficiency of the drilling operations as drilling progresses).

It is generally desirable to maximize the ROP while drilling a well, but there are limits to how fast the well can be drilled. Increases in the ROP also result in increases in the ECD, which is generally limited by the fracture gradient. If the fracture gradient is exceeded, drilling fluid will be lost to the formation and in an extreme case serious fluid losses can result. Thus, the goal is to maintain the drilling parameters within safe margins that maximize the ROP while preventing the ECD from getting too close to the fracture gradient. Another factor that can limit the ROP is the cuttings size. The ROP is increased by increasing the weight on bit (WOB), which also causes an increase in the cuttings size. Larger cuttings are more difficult to transport and can lead to both wellbore pressure management issues as well as stuck pipe issues. Smaller cuttings, which may be too small to be filtered, can increase the drilling fluid viscosity which can also cause the ECD to increase and can impose additional fluid maintenance requirements. Thus, based on all of these considerations, the more general overall goal is to match the bit to the formation and minimize drill solids contamination of the drilling fluid while maintaining an acceptable ROP and drill bit life. The illustrative embodiments described herein assist in achieving such goals by presenting visualizations of the optimization problem. These visualizations facilitate the identification of drilling control variable value ranges that produce optimal values for achievement variables such as ECD and cuttings size.

In the example presented, values produced by a drilling modeling program for two achievement variables, ECD and cuttings load, are tabularized as a function of three control variables, drilling fluid flow rate, cuttings diameter and ROP. Illustrative tabularized raw values for the ECD and cuttings load are shown in FIGS. 9A, 9B and 9C. The cuttings diameter Φ ranges from 0.1 to 0.5 inches, and the drilling fluid flow rate Q ranges from 300 to 700 gallons per minute (gpm). Three sets of tables are presented, one for each of three different ROPs: 50, 100 and 150 feet/hour (ft/hr). For the ECD, the achievement function of FIG. 5E is used (Gaussian distribution about a target value), with a target ECD value of 12.2 pounds per gallon (lbs/gal), a fracture gradient of 12.5 lbs/gal, and a standard deviation of ECD to pressure while drilling (PWD) of 0.1 lb/gal. Full achievement is represented by a value of 1, and decreases as the achievement level decreases. No achievement is represented by a value of 0. For the cuttings load, the achievement function of FIG. 5A is used (yes or no), with an achievement level of 1 (yes) for cuttings load values between 0 and 3 percent, and an achievement level of 0 (no) for cuttings load values above 3 percent. FIGS. 10A, 10B and 10C show the tabularized achievement levels produced from the achievement variable values of FIGS. 9A, 9B and 9C using these above-described achievement functions. Shading is used in the tables of FIGS. 10A, 10B and 10C to further illustrate the achievement level, with lower achievement levels being shown shaded darkly and increasingly higher achievement levels being shown with increasingly lighter shadings.

Because the ECD and cuttings load achievement levels are each referenced to the control variables (cuttings size, drilling fluid flow rate and ROP), the achievement levels may be combined to produce one or more combined achievement levels, each also a function of the control variables. FIGS. 11A-11C show illustrative combined achievement levels that result by weighting the ECD values by 0.8 and the cuttings loading by 0.2, and then adding the weighted values to produce the combined achievement levels. Again, the tables in each of FIGS. 11A-11C represent the combined achievement levels for each of three ROP values, 150, 100 and 50 ft/hr respectively. As is evident from FIGS. 11A-11C, the maximum combined achievement levels of between. 0.90 and 1.00 are obtained for drilling fluid flow rates of 600 to 700 gpm, cutting sizes below 0.3 inches, and an ROP of 50 ft/hr. This is due at least in part to higher flow rates and smaller cuttings facilitating better cuttings transport. Larger cutting sizes are more difficult to remove effectively, and can cause a significant increase in the ECD, cuttings load and drill string torque.

Figures 12, 13A, 13B, 13C:
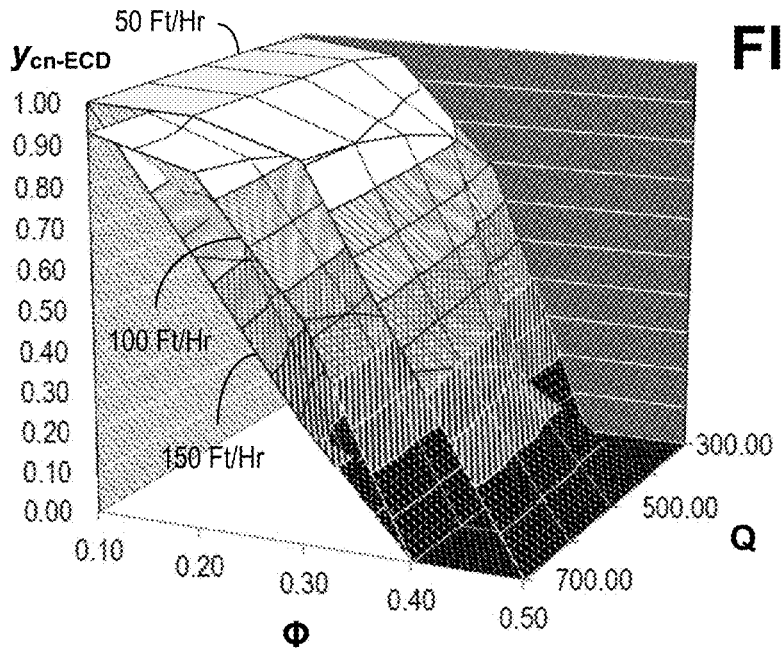
FIG. 12 shows an illustrative three-dimensional visualization of the combined achievement level values of the tables of FIGS. 11A-11C.
FIGS. 13A-13C show the achievement level tables of FIGS. 11A-11C after adjusting the achievement variable values to account for solids buildup in the drilling fluid.

While it is possible to determine from the tables of FIGS. 11A-11C which control variable value ranges produce the highest combined achievement levels, a three-dimensional visualization of achievement levels (individual and combined) provides a more effective way of presenting the data, as shown in FIG. 12. Such a visualization of the tabular data of FIGS. 11A-11C greatly facilitates identifying the control variable value ranges that maximize the combined achievement of the drilling system being characterized. The visualization also illustrates that at lower ROP values, the combined achievement level of the drilling system is less sensitive to changes in the values of the cutting sizes and the drilling fluid flow rate. Such behavior is not as readily apparent from the tabular data, and may be important if a certain degree of variability in the control variable values needs to be tolerated.

The value in identifying the sensitivity of achievement levels to variations in control value values is illustrated by the example achievement level visualization of FIG. 12. Any given drill bit will produce at least some variations in cuttings size. In the illustrative embodiment shown in FIG. 12, cuttings size variations between 0.1 and 0.3 inches only produce an achievement value decrease of up to 10% (down from 1.00 to 0.90) at an ROP of 50 ft/hr. But at an ROP of 150 ft/hr, the same cutting size variations can produce an achievement value decrease of up to 90% (down from 0.79 to 0.08). The illustrative visualization of FIG. 12 further shows that at an ROP of 150 ft/hr the drilling system is much more sensitive to variations in the drilling fluid flow rate. The illustrative visualization of FIG. 12 thus readily makes it apparent that increasing the ROP, which is generally viewed as desirable, may actually push the drilling system into an operating range that may be difficult and/or expensive to sustain, potentially nullifying any gains achieved by increasing the ROP.

In addition to assisting with the identification of control variable sensitivities, the illustrative visualizations may also assist in concisely presenting the effect of varying additional parameters within the drilling model. FIGS. 13A-13C show an example of such an additional variation, wherein the ECD combined achievement levels for the example of FIGS. 11A-11C are recalculated after adjusting the model to account for the effect of accumulated solids within the drilling fluid. Such an accumulation occurs when low gravity solids, the result of rock destruction, become entrained in the drilling fluid. This causes a change in the viscosity of the drilling fluid that that in turn causes changes in the combined ECD achievement levels as shown in the tables of FIGS. 13A-13C. When the combined ECD achievement levels for the highest achieving ROP for each case (with and without solids) are presented in the visualization of FIG. 14, it is clear that the range in cutting size needs to be more carefully monitored and constrained whenever it is anticipated that significant amounts of solids will be entrained in the drilling fluid. The visualization may also assist with decisions regarding what fluid maintenance intervals might be required for the drilling operation being designed.

It should be noted that although the example of FIGS. 13A-14 shows each case individually (with and without solids) within the visualization presented, a combined achievement level (i.e., a combination of combined achievement values) could also be calculated and presented in a visualization (not shown) that would allow a drilling designer to select ranges of the cutting size that would account for both drilling with and without solids. This can occur in extended reach drilling (ERD), where many different types of materials may be encountered, creating significant variations in the amount of entrained solids in the drilling fluid. Thus, in the example shown in FIG. 14, maintaining a cuttings size of between 0.2 and 0.25 inches would help to maintain the combined ECD achievement levels consistently higher throughout the drilling of such a well.

As the above descriptions imply, it is possible to combine multiple achievement levels (individual and combined), presenting both individual and combined achievement level visualizations to assist in deciding which control variable values will provide an optimal solution. The following example illustrates this combinatorial process as part of a model-based drilling design, and further describes an illustrative embodiment of a visualization of the combinatorial process itself. The example assumes a fixed cuttings size of 0.25 inches, a target ECD value of 12.2 lbs/gal, a fracture gradient 12.5 lbs/gal, a drillstring rotational speed range of 40 to 160 RPM, a drilling fluid flow rate range of 500 to 1000 gpm, ROPs of 25, 75, 125, 175 and 225 ft/hr, and the following achievement variables:

ECD as a function of drilling fluid flow rate, drillstring RPM and ROP;

Standing Pipe Pressure (SPP) as a function of drilling fluid flow rate; and

Bottom Hole Assembly (BHA) vibration as a function of RPM.

Figures 15E, 16:
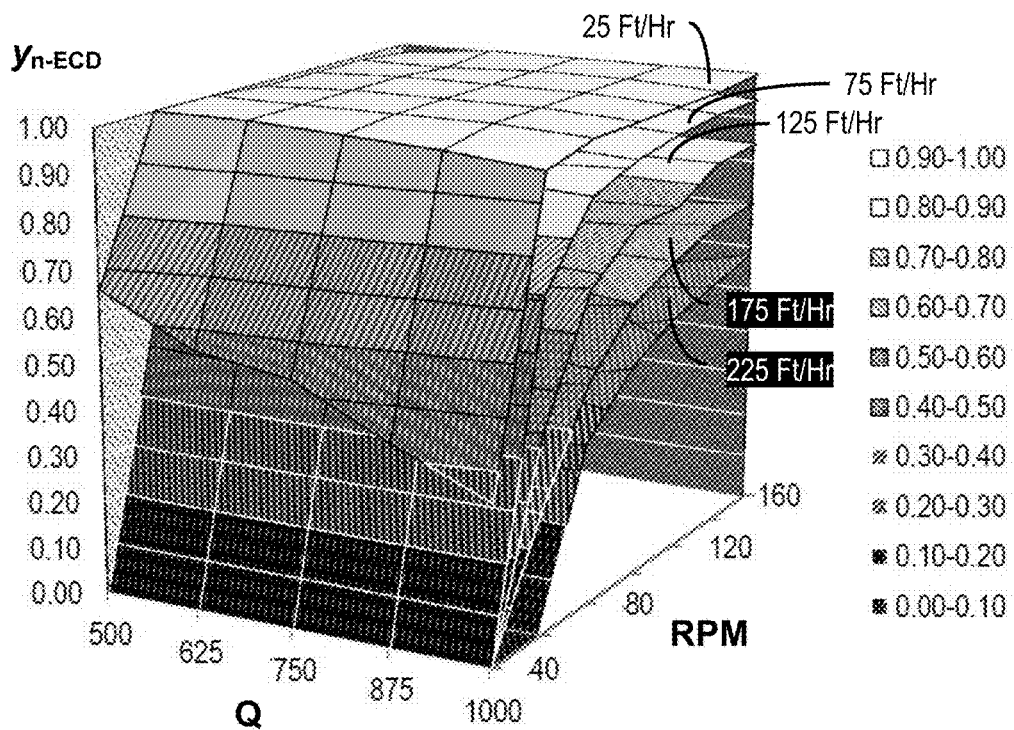

As in the prior examples, each of the achievement variable values used to measure the performance of the drilling system is transformed into achievement levels by an achievement function. FIGS. 15A-15E show the tabularized ECD achievement levels as a function of drilling fluid flow rate, drillstring RPM and 5 different ROP rates. FIG. 16 shows an illustrative visualization of these ECD achievement levels. The graph shows the impact of pipe rotation on cuttings transport, and thus on ECD. Below 40 RPM the ECD increases past the fracture gradient and drives the ECD achievement level towards 0, which is the result of a high cuttings loading contribution to the wellbore pressure. As RPM increases, the cuttings transport improves and the cuttings load decreases, quickly increasing the ECD achievement level. As can be seen from the graph of FIG. 16, the increases in ECD achievement resulting from increases in rotational speed above 80 RPM are much less significant than those below 80 RPM. The visualization of FIG. 16 makes it apparent that the improved cuttings transport resulting from higher drillstring RPMs may not be justified, given the degree of extra wear on the BHA.

Figures 17, 18:
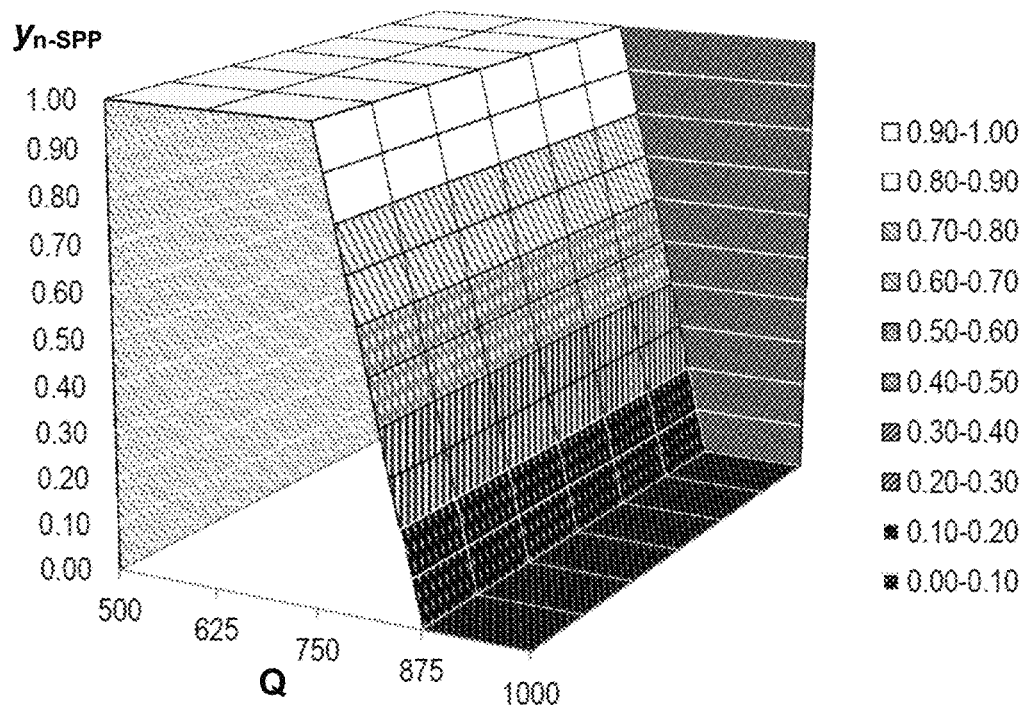
FIG. 17 shows example tabularized SPP achievement levels as a function of drilling fluid flow rate.
FIG. 18 shows an illustrative graph of the achievement level table of FIG. 17.
Figures 19, 20:
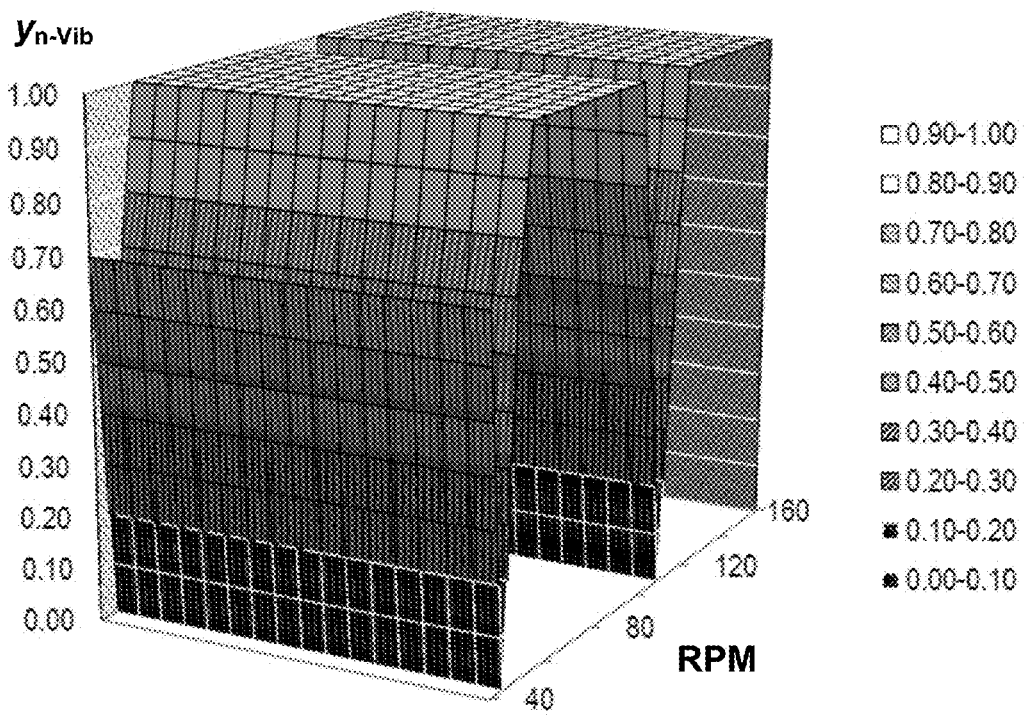
FIG. 19 shows example tabularized BHA vibration achievement levels as a function of RPM.
FIG. 20 shows an illustrative graph of the achievement level table of FIG. 19.

While the information presented in the illustrative visualization of FIG. 16 is very useful in efficiently presenting large amount of drilling modeling information in a concise manner, even more useful information may be combined with the ECD data. To do this, additional achievement variable values (each a function of one or more control variables) are first transformed into achievement levels. FIG. 17, for example, shows SPP achievement levels for the drilling system being designed. For this system, the maximum drilling pressure for the rig is assumed to be 3500 psi, which occurs at drilling fluid flow rates above 750 gpm. Thus, the achievement level is 1 for drilling fluid flow rates at or below 750 gpm, and 0 for drilling fluid flow rates above 750 gpm. The resulting achievement levels are graphed in FIG. 18, which are independent of both RPM and ROP. Similarly, BHA vibration values are transformed to the achievement levels tabularized in FIG. 19, reflecting unacceptable and/or undesirable vibrations at/around 45 RPM and 110 RPM. The BHA achievement levels in the example shown are independent of drilling fluid flow rate and ROP, and are graphed in FIG. 20. Nonetheless, in other embodiments the BHA achievement levels may not be independent of the drilling fluid flow rate and ROP.

Once the achievement variable values (ECD, SPP and BHA vibration) are transformed into achievement levels, which by definition are normalized and unitless, the achievement levels may be combined with each other. Such a combination is shown in the illustrative tabularizations of FIGS. 21A-21E and the illustrative graph of FIG. 22. The combination of the example shown is the result of a weighted sum of the achievement levels, with each of the ECD, SPP and BHA vibration achievement levels being given equal weight. The resulting graph of FIG. 22 helps identify the range of control variables that warrant consideration by condensing a significant amount of information (e.g., the tables of FIGS. 15A-15E, 17, 19 and 21A-21E) into a single visualization.

Figures 21E, 22:
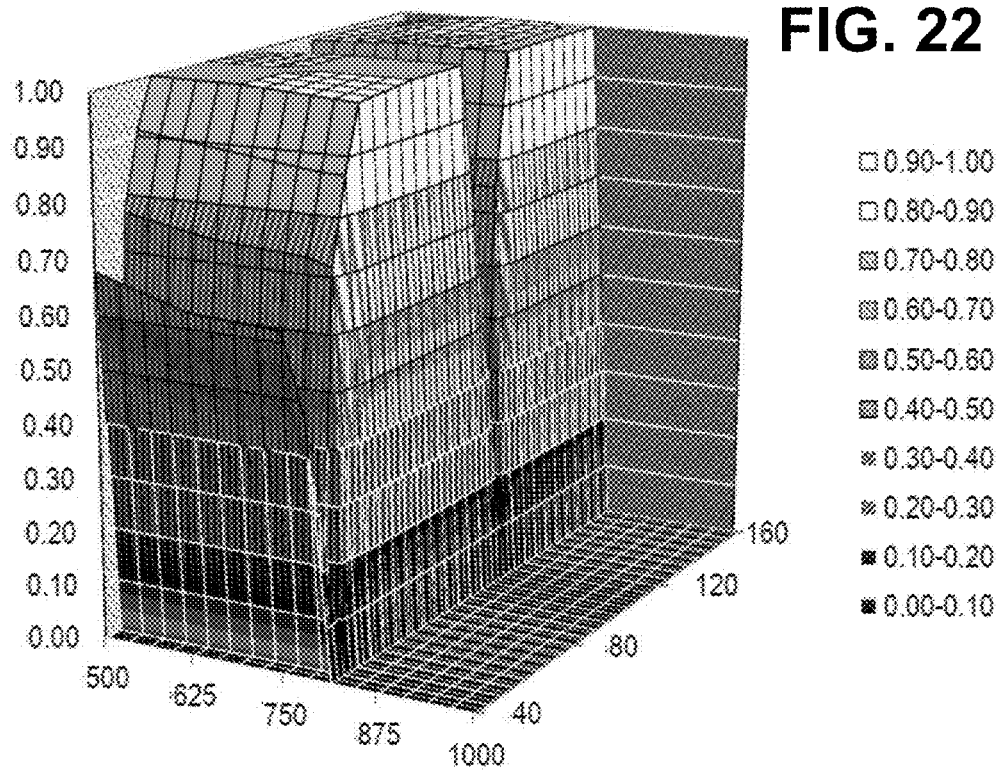
Figure 23:
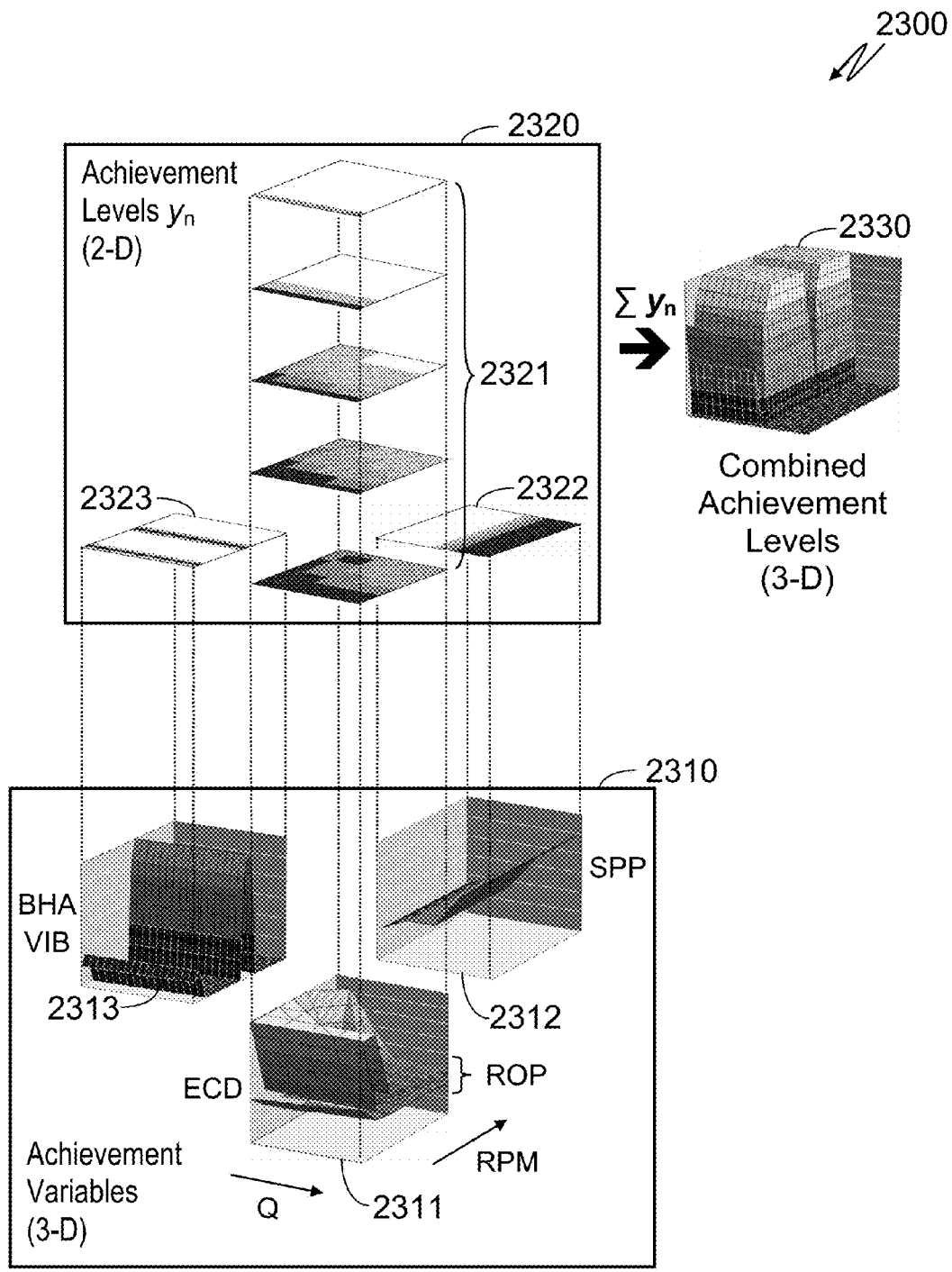
FIG. 23 shows an illustrative visualization of the combination of the models and achievement level graphs in the examples of FIGS. 15A-22.

While the illustrative visualization of FIG. 22 provides an effective tool for presenting valuable information about a drilling system design, even more information may be concurrently presented by a visualization that graphically presents the above-described combination. FIG. 23 shows such an illustrative visualization 2300 that combines 3-dimensional (3-D) achievement variable visualizations 2310 with 2-dimensional (2-D) achievement level visualizations 2320 and the 3-D combined achievement level visualization 2330. The association between each 3-D achievement variable visualization and its corresponding 2-D achievement level visualization is illustrated by interconnecting projection lines. Thus, ECD achievement variable visualization 2311 is associated with ECD achievement level visualizations 2321, SPP achievement variable visualization 2312 is associated with SPP achievement level visualizations 2322, and BHA vibration achievement variable visualization 2313 is associated with BHA vibration achievement level visualization 2323. It should be noted that each of the 2-D visualization respectively correspond to the 3-D visualizations of FIGS. 16 (ECD), 18 (SPP) and 20 (BHA vibration).

Continuing to refer to the illustrative visualization of FIG. 23, each of the 3-D achievement variable visualizations are positioned relative to one another to further illustrate the relationship between the achievement variables and the control variables that determine the achievement variable values, and which achievement variables are a function of common control variables. Thus, in the example of FIG. 23, the ECD achievement variable is a function of drilling fluid flow rate control variables Q, RPM and ROP. The SPP achievement variable is a function of only the Q control variable, and the BHA vibration achievement variable is a function of only the RPM control variable. The drilling designer thus can see from the illustrative visualization, for example, that varying the drillstring RPM will result in variations of both the BHA vibration and ECD achievement variables, while ROP variations will only produce changes in the ECD achievement variable.

The 2-D achievement level visualizations of the illustrative embodiment of FIG. 23 are combined as previously described to produce 3-D combined achievement level visualizations 2330. In the example shown, a weighted sum is used, though any number of other techniques may be used to implement the combination, such as simple multiplication of achievement levels, ranked weighted sum of achievement levels, and individual comparison ranked weighted sum of achievement variables, and all such combination techniques are within the scope of the present disclosure. In at least some illustrative embodiments, the specific achievement level visualizations and/or sets of achievement level visualizations 2320 that are combined to produce combined 3-D achievement level visualizations 2330 may be interactively selected by a drilling designer operating a computer-based embodiment. Such interactive selections enable the drilling designer to see the effects of each combination on the overall combined achievement level of the drilling design.

It should be noted that the use of the 2-D achievement level visualizations 2320 helps a drilling designer see the achievement level data from yet another perspective that helps to quickly compare achievement level visualizations and identify specific achievement level combinations of interest. For example, FIGS. 16 and 23 both show ECD achievement level visualizations, but the 2-D visualization of 23 provides an alternate compact and unobstructed visual comparison of the data for each of the five represented ROP values. Thus, for example, it is clear from 2-D ECD achievement level visualizations 2321 that slightly higher ROP rates (which increase from top to bottom) may be tolerated without significantly sacrificing achievement levels (which decrease from lighter to darker shading). FIG. 23 also illustrates the fact that the ROP may be changed without affecting either the SPP or BHA vibration achievement levels, since neither depends upon the ROP.

Figure 24:
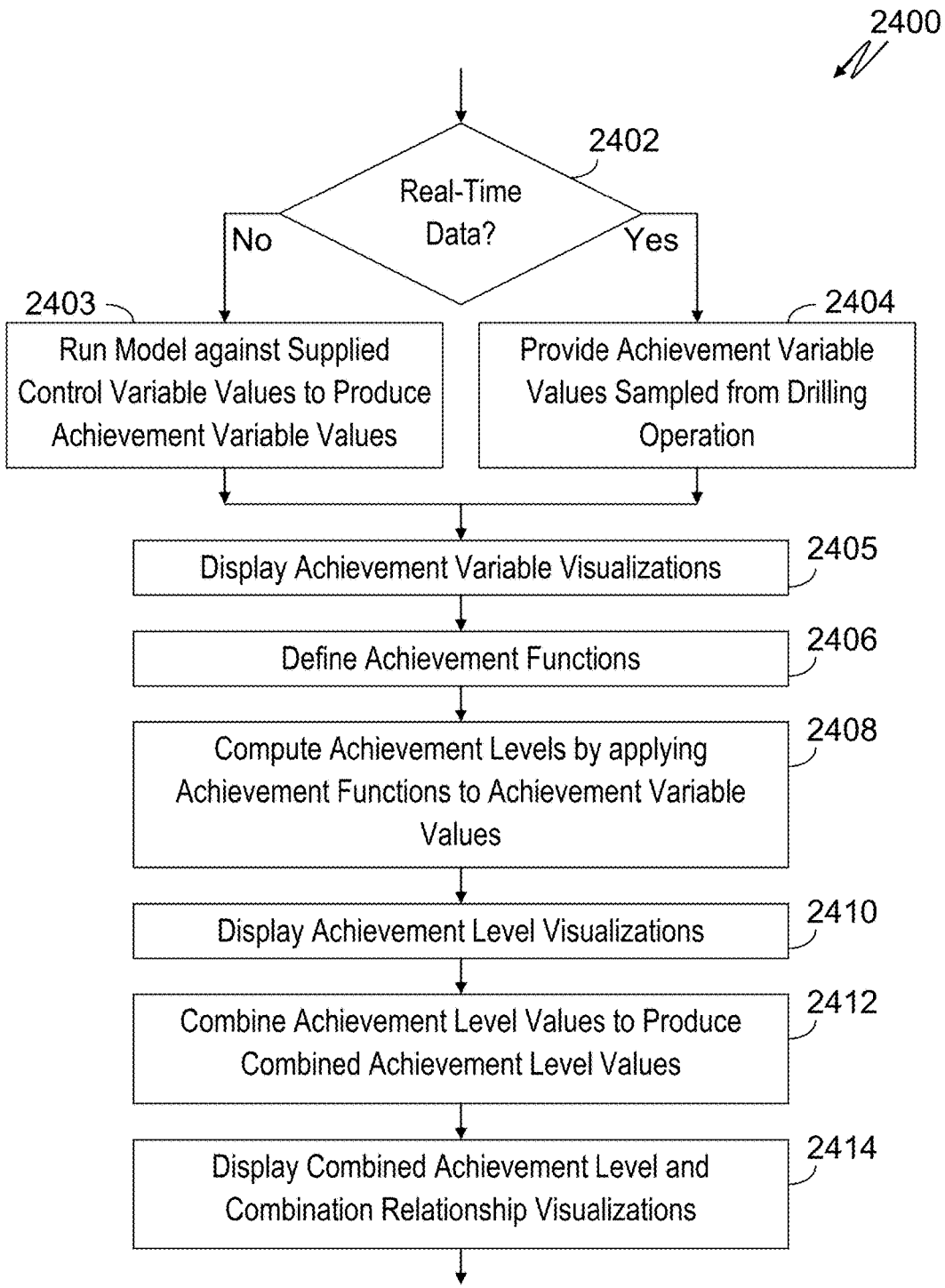
FIG. 24 shows an illustrative method for producing and visualizing achievement levels and combinations of achievement levels from either a drilling modeling program or real-time drilling data.

The above-described visualizations and combinations of visualizations are further described in FIG. 24 as illustrative method 2400, suitable for use in the design phase of a drilling operation. In this method, if the input data is real-time data (block 2402), sampled achievement variable values are provided to the method (block 2404). Otherwise a model of a system (e.g., the above-described drilling operation) is applied to control variable values provided as inputs to the method, producing achievement variable values (block 2403). One or more visualizations of the resulting achievement variable values (real or modeled) are then displayed to a user (block 2405). Alternatively, the achievement variable visualizations may be presented at a later time (e.g., at the end of the method).

Once the achievement variables have been produced/provided, achievement functions are defined (block 2406) that describe the relationships between achievement variables and achievement levels (and by implication between control variables and achievement levels). Achievement levels are produced based upon the achievement variable values of either block 2403 or block 2404 by applying the achievement functions to the relevant achievement variable values (block 2408). Visualizations of the resulting achievement levels are then displayed to a user (block 2410), though these visualizations may also alternatively be presented at a later time. The achievement level values are combined to produce combined achievement level values (block 2412) which are presented to the user as one or more combined achievement level visualizations (block 2414). One or more visualizations of the combination relationships are also presented to the user (block 2414), ending method 2400.

While method 2400 may be used to present visualizations of data produced by either drilling simulations or actual drilling operations, the method may also be combined within the control loop of an actual drilling operation, wherein real-time data is used to visualize the actual achievement of the drilling operation and adjustments are made as needed to the modeling parameters to match measured achievement variable values. The results from the adjusted model may then be used to guide control variable value selections as drilling progresses. These adjustments operate to improve the accuracy of the model and to provide achievement level visualizations (individual and combined) that reflect actual drilling conditions. Such real-time monitoring and feedback thus allows the achievement level visualizations of both the model and actual drilling to be used together to improve the combined achievement of the drilling operation as actual drilling progresses.

Figure 25:
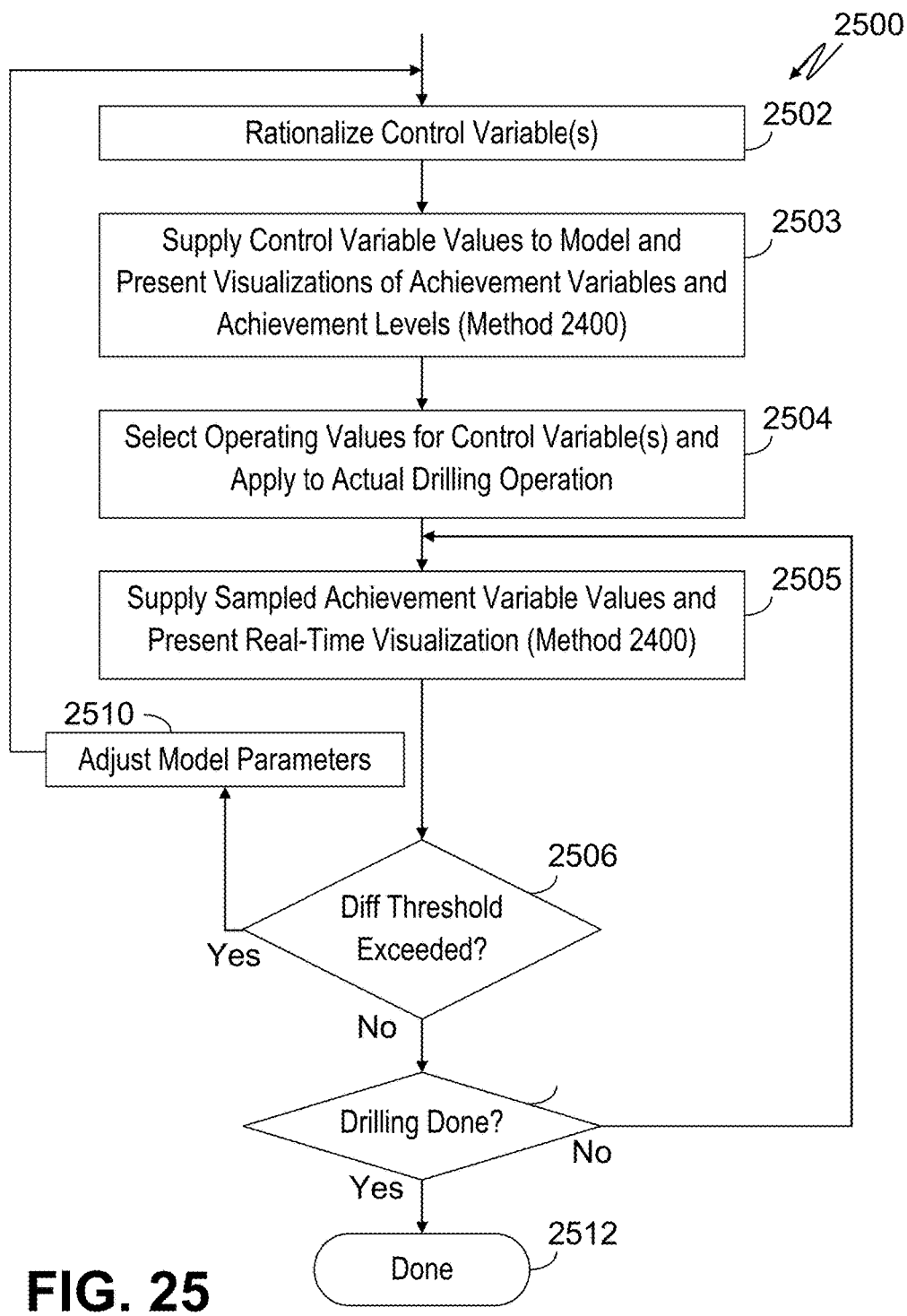
FIG. 25 shows an illustrative method for incorporating the method of FIG. 24 into a real-time drilling operation control loop.

FIG. 25 shows an illustrative example of method 2400 being integrated into real-time method 2500. A drilling engineer (or team of engineers) decides on or "rationalizes" a range of control variables values to supply to the model (block 2502) based on any of a number of objective and/or subjective criteria (e.g., based upon initial modeling results produced during the design phase of the drilling system). These control variable values are supplied to the method 2400 to produce the various achievement variable and achievement level visualizations as previously described (block 2503). These visualizations are together used to decide upon a range of control variable operating values to use, which are then applied to the actual drilling operation (block 2504).

As drilling progresses, actual measured achievement variable values and corresponding achievement levels are presented by method 2400 as real-time visualizations to the drilling engineer(s) (block 2505). These visualizations enable the drilling engineer(s) to continuously monitor and compare real and modeled values. Such visualizations may include superimposing an indication of a current achievement variable over a 2-D and/or 3-D visualization of the modeled achievement variable, and/or similarly superimposing current individual and combined achievement levels over their corresponding 2-D and/or 3-D modeled visualization. Alternatively, an X/Y plot of an achievement variable or level may be presented, together with its targeted model value, as a function of time. Many other types of comparative visualizations will become apparent to those of ordinary skill in the art, and all such comparative visualizations are within the scope of the present disclosure.

As long as the differences between modeled and real-time values do not exceed a threshold (block 2506) and drilling has not completed (block 2508), drilling continues with the selected modeling parameters and control variable values. If the model/real-time value differences exceed a threshold (block 2506), the model parameters are adjusted to account for the differences (block 2510). The control variables are again rationalized (block 2502) and supplied to method/block 2400A, and control variable operating values are again selected for drilling (block 2504) reflecting the updated modeling parameters and resulting achievement levels. Blocks 2505 and 2506 are then again executed. In this manner, the control variable values are adjusted as drilling proceeds to reflect actual drilling conditions, maintaining the drilling operation's combined achievement level at or near the targeted value(s). Real-time method 2500 continues to execute until drilling is completed (blocks 2508 and 2512).

Figure 26:
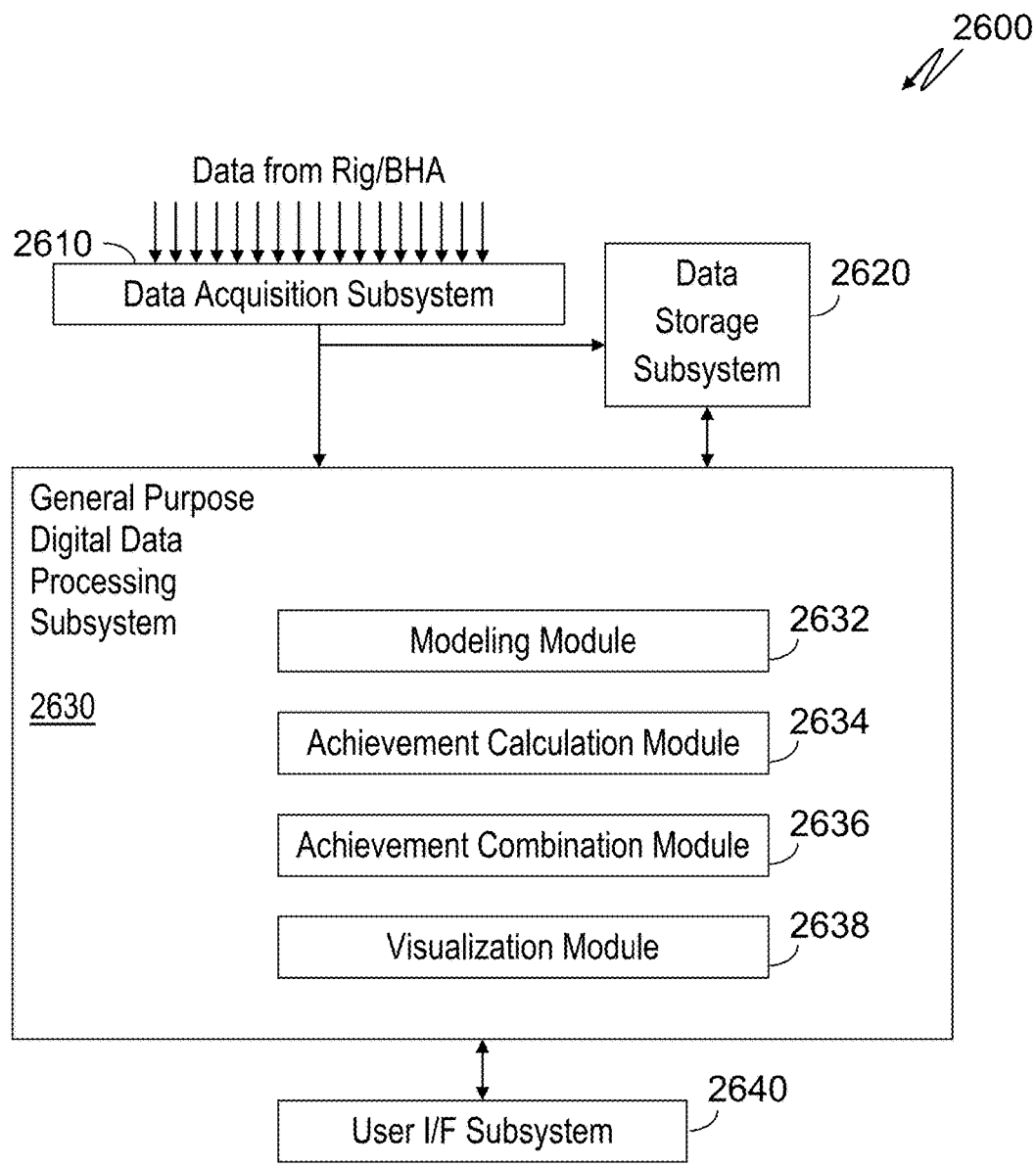
FIG. 26 shows an illustrative computer-based system suitable for implementing the methods of FIGS. 24 and 25.

Methods 2400 and 2500 may be performed by a computer-based system, as illustrated by example system 2600 of FIG. 26. Telemetered data is collected from drilling rig sensing systems and BHA sensors by data acquisition subsystem 2610. The data reflects a wide variety of measured drilling parameters, including the control variables and achievement variables of interest. Data acquisition subsystem 2610 couples to both general purpose digital data processing (GPDDP) subsystem 2630 and data storage subsystem 2620. Data acquisition subsystem 2610 provides the collected data to either GPDDP subsystem 2610 for processing, to data storage subsystem 2620 for storage and later/additional processing, or concurrently to both subsystems.

Data storage subsystem 2620 may use any of a number of known storage technologies, including but not limited to RAM, Flash memory, magnetic media, optical media, fixed media, removable media, storage area networks, and network attached storage, just to name a few examples. Data storage subsystem 2620 provides data storage for GPDDP subsystem 2630, in addition to any similar storage maintained within GPDDP subsystem 2630. Such data includes, but is not limited to, modeling configuration data, modeling results, achievement data and visualization data.

GPDDP subsystem 2630 may be implemented using any of a wide variety of computing devices and technologies, including but not limited to personal computers, mobile computers, workstation computers, server computers, blade computers, mainframe computers, clustered computers, distributed computer systems, virtual computers, single and/or multi-core processors, single and/or multi-processor systems, and client-server computer systems, just to name a few examples. Those of ordinary skill in the art will appreciate that any of a wide variety of computing systems are suitable for implementing computer-based embodiments of the systems and methods described herein, and all such computing systems are within the scope of the present disclosure.

Continuing to refer to FIG. 26, a number of software modules 2632-2638 execute on GPDDP subsystem 2630 which together are capable of implementing methods 2400 and 2500. Modeling module 2632 applies a mathematical model of a drilling operation to a range of control variables, rationalized and selected interactively by a user of system 2600 and provided to the system via user I/F subsystem 2640, also coupled to GPDDP subsystem 2630. Alternatively, the user may utilize user I/F subsystem 2640 to configure modeling module 2632 to apply the model to a selection of control variable value ranges previously stored on data storage subsystem 2620. Modeling module 2632 of the embodiment of FIG. 26 provides the resulting achievement variable values to achievement calculation module 2634, which applies one or more achievement functions to the achievement variable values to generate achievement levels. The user, via user interface subsystem 2640, interactively provides the achievement functions to achievement calculation module 2634, or alternatively configures achievement calculation module 2634 to retrieve and apply achievement functions previously saved on data storage subsystem 2620.

The achievement combination module 2636 is configured interactively by the user via user I/F subsystem 2640 to combine one or more sets of achievement level values to produce combined achievement values. Alternatively, the user may enable achievement combination module 2636 to combine the achievement levels according to a configuration previously saved on data storage subsystem 2620. Visualization module 2638 generates a visualization of any and/or all of the results of each of modules 2632-2636, which is presented to the user through a display device that is part of user I/F subsystem 2640. The visualizations may be presented as each module completes its individual task, or together after all three modules have performed their tasks. Additionally, the user may utilize user I/F 2640 to direct visualization module 2638 to selectively display any individual visualization, or any part of any individual visualization. This includes, but is not limited to, control variable values, achievement variable values, achievement levels, combined achievement levels and any and/or all relationships between these values and levels.

Numerous other modifications, equivalents, and alternatives, will become apparent to those skilled in the art once the above disclosure is fully appreciated. For example, although the embodiments of the present disclosure describe drilling operation examples, other embodiments may include downstream petrochemical refining, mining operations, mineral processing, raw materials production and product manufacturing. Also, although the present disclosure describes the use of achievement values that measure the degree to which objectives are achieved, the systems and methods described would also apply wherein the degree to which an objective is not achieved is measured instead.

Further, other control variables and achievement variables will become apparent to those of ordinary skill in the art that may affect the combined level of achievement of a system and that may be included in the systems and methods described. Such variables, include, but are not limited to, costs associated with specific techniques or operations, availability of resources, time limitations, market conditions and risk. While some of these variables may not be objectively quantifiable, such objectiveness is not required by the systems and methods described, as long as the variables are assigned values (even subjective ones) with achievement levels that can be characterized by an achievement function. All such variables are within the scope of the present disclosure. It is intended that the following claims be interpreted to embrace all such modifications, equivalents, and alternatives where applicable.

What is claimed is:

1. An optimization visualization method that comprises:
   obtaining a plurality of first achievement values for a first achievement variable representing characteristics of a first physical object or first process, the obtaining comprising measuring at least one of the plurality of first achievement values during drilling of the well, and wherein each first achievement value corresponds to one or more first control variables comprising measured parameters associated with the drilling of the well including at least one common control variable;
   obtaining a plurality of second achievement values for a second achievement variable representing characteristics of a second physical object or second process, the obtaining comprising measuring at least one of the plurality of second achievement values during drilling of the well, and wherein each second achievement value corresponds to one or more second control variables comprising measured parameters associated with the drilling of the well including the at least one common control variable;
   defining a plurality of achievement functions such that each achievement function generates a normalized achievement level for an input achievement value based on at least:
   a determination of whether the input achievement value maintained within a predetermined acceptable range defined by said each achievement function, and
   a quantification of a proximity of the input achievement value to a threshold between the acceptable range and an unacceptable range defined by said each achievement function;
   generating a first set of first achievement levels by applying at least one of the plurality of achievement functions to the plurality of first achievement values, each first achievement level corresponding to the same the one or more first control variables including the at least one common control variable;
   generating a second set of second achievement levels by applying at least one of the plurality of achievement functions to the plurality of second achievement values, each second achievement level corresponding to the same the one or more second control variables including the at least one common control variable;
   combining the first set of the first achievement levels and the second set of the second achievement levels to produce a set of combined achievement levels, each combined achievement level corresponding to the at least one common control variable;
   presenting a visual representation of the set of the combined achievement levels to a user, enabling the user to select value ranges for the at least one common control variable and modifying the visual representation in response to the selected value ranges; and
   presenting a status of the drilling of the well at least in part by updating the visual representation such that the set of the combined achievement levels comprises actual combined achievement levels of the drilling of the well.

2. The method of claim 1, wherein each of the first set of the first achievement levels and the second set of the second achievement levels comprise a normalized range of values between a lower normalization value and an upper normalization value.

3. The method of claim 1, wherein the combining comprises performing one or more weighted summations of the first set of the first set achievement levels and the second set of the second achievement levels ranges.

4. The method of claim 1, further comprising:
   superimposing in real-time a visualization of the actual combined achievement levels of the drilling of the well over the visualization of modeled combined achievement levels of the drilling of the well;
   comparing the actual combined achievement levels to the modeled combined achievement levels; and adjusting one or more modeling parameters in response to determining that a difference between the actual combined achievement levels and the modeled combined achievement levels exceeds a threshold value.

5. The method of claim 1, further comprising:
obtaining values for at least the first control variables and the second control variables;
configuring a drilling modeling program with at least the obtained values for the first and second control variables;
calculating, using the configured drilling modeling program, at least one of the plurality of first achievement values and the plurality of second achievement values; and
presenting drilling modeling results at least in part by updating the visual representation such that the set of the combined achievement levels comprises modeled combined achievement levels of the drilling modeling program.

6. The method of claim 5, further comprising:
superimposing in real-time a visualization of the actual combined achievement levels of a drilling of a well over the visual representation of the modeled combined achievement levels of the drilling modeling program;
comparing the actual combined achievement levels to the modeled combined achievement levels; and
adjusting the at least one common control variable based upon the results of the comparing.

7. The method of claim 1, wherein the at least one common control variable is selected from the group consisting of, drilling fluid flow rate, drillstring revolutions per minute, rate of penetration and weight on bit.

8. The method of claim 1, further comprising:
combining an additional set of achievement levels, corresponding to a plurality of additional achievement values for an additional achievement variable, with the set of the combined achievement levels to thereby produce a set of second combined achievement levels; and
presenting the visual representation of the set of the second combined achievement levels to the user.

9. The method of claim 1, further comprising:
combining a set of second combined achievement levels, resulting from a combination of two or more additional corresponding sets of achievement levels, with the set of the combined achievement levels to thereby produce a set of third combined achievement levels; and
presenting the visual representation of the set of the third combined achievement levels to the user.

10. The method of claim 1, further comprising:
acquiring achievement values for at least the first and second achievement variables; and
evaluating said each of the plurality of achievement functions in real-time for each acquired achievement value.

11. The method of claim 1, further comprising:
acquiring and storing achievement values for at least the first and second achievement variables; and
evaluating said each of the plurality of achievement functions at a later time for each stored achievement value.

12. The method of claim 1, further comprising:
presenting visualizations of at least one range of achievement variable values and of a corresponding set of achievement levels range; and
presenting the visual representation of a relationship between the at least one range achievement variable values and the corresponding set of the achievement levels comprising projection lines between at least one achievement variable value range visualization and a corresponding achievement level range visualization.

13. The method of claim 1, further comprising presenting a three-dimensional visual representation of a relationship between at least the first and second achievement variables, each of the first and second achievement variables derived from the at least one common control variable, by:
superimposing a first visualization of the first achievement variable and a second visualization of the second achievement variable by aligning respective axes of the first and second visualizations which correspond to the at least one common control variable.

14. The method of claim 1, further comprising presenting a three-dimensional visual representation of a relationship between at least the first and second achievement variables, each of the first and second achievement variables derived from at least two common control variables, by:
superimposing a first visualization of the first achievement variable and a second visualization of the second achievement variable by aligning two respective axes of each of the first and second visualizations which correspond to corresponding to two of the at least two common control variables, for visualizations of said each of the first and second achievement variables; and
offsetting one remaining axes for the first visualization of the first achievement variable and the second visualization of the second achievement variable.

15. An optimization visualization system that comprises:
a processor; and
a user interface subsystem, coupled to the processor, comprising an input device that enables a user to input data into the system and a display device that provides the data to the user; wherein the processor executes software that causes the system to:
obtain a plurality of first achievement values for a first achievement variable representing characteristics of a first physical object or first process, wherein each first achievement value corresponds to one or more first control variables including at least a common control variable;
obtain a plurality of second achievement values for a second achievement variable representing characteristics of a physical object or process, wherein each second achievement value corresponds to one or more second control variables including the at least the common control variable;
define a plurality of achievement functions such that each achievement function generates a normalized achievement level for an input achievement value based on at least:
a determination of whether the input achievement value is maintained within a predetermined acceptable range defined by said each achievement function, and
a quantification of a proximity of the input achievement value to a threshold between the acceptable range and an unacceptable range defined by said each achievement function;
generate a first set of first achievement levels by applying at least one of the plurality of achievement functions to the plurality of first achievement values, each first achievement level corresponding to the same one or more first control variables including the at least the common control variable;
generate a second set of second achievement levels by applying at least one of the plurality of achievement functions to the plurality of second achievement values, each second achievement level corresponding to the same one or more second control variables including the at least the common control variable;

combine at least the first set of the first achievement levels and the second set of the second achievement levels to produce a set of combined achievement levels, each combined achievement level corresponding to the at least the common control variable;

present on the display device a visual representation of the set of the combined achievement levels to the user, enabling the user to select value ranges for the at least the common control variable; and a data acquisition subsystem coupled to the processor, wherein the software further causes the processor to:

measure the first achievement variable and the second achievement variable, using the data acquisition subsystem during a drilling of a well, to thereby obtain at least one of the plurality of first and second achievement values;

measure one or more parameters associated with the drilling of the well to thereby obtain values for the one or more of the first control variables and the second control variables; and present a status of the drilling of the well at least in part by updating on the display device the visual representation such that the set of the combined achievement levels comprises actual combined achievement levels of the drilling of the well.

16. The system of claim 15, wherein each of the first set of the first achievement levels and the second set of the second achievement levels comprise a normalized range of values between a lower normalization value and an upper normalization value.

17. The system of claim 15, wherein the software further causes the processor to execute a combination by performing one or more weighted summations of the first set of the first achievement levels and the second set of the second achievement levels.

18. The system of claim 15, wherein the software further causes the processor to:
superimpose in real-time on the display device a visualization of the actual combined achievement levels of the drilling of the well over the visualization of modeled combined achievement levels of the drilling of the well;
compare the actual combined achievement levels to the modeled combined achievement levels; and
adjust one or more modeling parameters in response to determining that a difference between the actual combined achievement levels and the modeled combined achievement levels exceeds a threshold value.

19. The system of claim 15, wherein the software further causes the processor to:
obtain values for at least the first control variables and the second control variables:
configure a drilling modeling program with at least the obtained values for the first and second control variables:
calculate, using the configured drilling modeling program, at least one of the plurality of first achievement values and the plurality of second achievement values; and
present drilling modeling results at least in part by updating on the display device the visual representation such that the set of the combined achievement levels comprises modeled combined achievement levels of the drilling modeling program.

20. The system of claim 19, wherein the software further causes the processor to:
superimpose in real-time on the display device a visualization of the actual combined achievement levels of a drilling of a well over the visual representation of the modeled combined achievement levels of the drilling modeling program;
enable a comparison of the actual combined achievement levels and the modeled combined achievement levels; and
accept from the input device one or more adjustments to the at least the common control variable that are based upon the results of the comparison.

21. The system of claim 15, wherein the at least the common control variable is selected from the group consisting of, drilling fluid flow rate, drillstring revolutions per minute, rate of penetration and weight on bit.

22. The system of claim 15, wherein the software further causes the processor to:
combine an additional set of achievement levels, corresponding to a plurality of additional achievement values for an additional achievement variable, with the set of the combined achievement levels to thereby produce a second combined achievement levels; and
present the visual representation of the second combined achievement levels to the user.

23. The system of claim 15, wherein the software further causes the processor to:
combine a set of second combined achievement levels, resulting from a combination of two or more additional corresponding sets of achievement levels, with the set of the combined achievement levels to thereby produce a set of third combined achievement levels; and
present on the display device the visual representation of the set of third combined achievement levels to the user.

24. The system of claim 15, further comprising a data acquisition subsystem coupled to the processor, wherein the software further causes the processor to:
cause the data acquisition subsystem to acquire achievement values for at least the first and second achievement variables; and
evaluate said each of the plurality of achievement functions in real-time for each acquired achievement value.

25. The system of claim 15, further comprising a data acquisition subsystem and a data storage subsystem both coupled to the processor and to each other, wherein the software further causes the processor to:
cause the data acquisition subsystem to acquire and store on the data storage subsystem achievement values for at least the first and second achievement variables; and
evaluate said each of the plurality of achievement functions at a later time for each stored achievement value.

26. The system of claim 15, wherein the software further causes the processor to:
present on the display device visualizations of at least one range of achievement variable values and of a corresponding set of achievement levels; and
present on the display device the visual representation of a relationship between at least one range of achievement variable values and the corresponding set of achievement levels comprising projection lines between at least one achievement variable value range visualization and a corresponding achievement level range visualization.

27. The system of claim 15, wherein the software further causes the processor to present on the display device a three-dimensional visual representation of a relationship between at least the first and second achievement variables, each of the first and second achievement variables derived from the at least the common control variable, by causing the processor to:
   superimpose a first visualization of the first achievement variable and a second visualization of the second achievement variable by aligning respective axes of the first and second visualizations which correspond to the at least the common control variable.

28. The system of claim 15, wherein the software further causes the processor to present on the display device a three-dimensional visual representation of a relationship between at least the first and second achievement variables, each of the first and second achievement variables derived from at least two common control variables, by causing the processor to:
   superimpose a first visualization of the first achievement variable and a second visualization of the second achievement variable by aligning two respective axes of each of the first and second visualizations which correspond of the at least two common control variables.

* * * * *